United States Patent [19]

Puhl

[11] 4,434,461
[45] Feb. 28, 1984

[54] MICROPROCESSOR WITH DUPLICATE REGISTERS FOR PROCESSING INTERRUPTS

[75] Inventor: Larry C. Puhl, Sleepy Hollow, Ill.

[73] Assignee: Motorola, Inc., Schaumburg, Ill.

[21] Appl. No.: 187,302

[22] Filed: Sep. 15, 1980

[51] Int. Cl.³ .......................... G06F 9/46; G06F 7/14
[52] U.S. Cl. .................................. 364/200; 455/33
[58] Field of Search ... 364/200 MS File, 900 MS File

[56] References Cited

U.S. PATENT DOCUMENTS

| | | |
|---|---|---|
| D. 234,605 | 3/1975 | Larson . |
| 3,458,664 | 7/1979 | Adlhoch et al. . |
| 3,571,519 | 3/1971 | Tsimbidis . |
| 3,701,105 | 10/1972 | Finnegan et al. . |
| 3,753,236 | 8/1973 | Flynn ................................. 364/200 |
| 3,766,524 | 10/1973 | Maring et al. . |
| 3,798,615 | 3/1974 | Weisbecker ........................ 364/200 |
| 3,806,663 | 4/1974 | Peek et al. . |
| 3,858,182 | 12/1974 | Delagi ................................ 364/200 |
| 3,905,025 | 9/1975 | Davis ................................. 364/200 |
| 3,906,166 | 9/1975 | Cooper et al. . |
| 3,962,553 | 6/1976 | Linder et al. . |
| 3,972,024 | 7/1976 | Schroeder et al. . |
| 3,979,730 | 9/1976 | Bennett et al. . |
| 4,003,028 | 1/1977 | Bennett et al. . |
| 4,004,281 | 1/1977 | Bennett ............................. 364/200 |
| 4,004,283 | 1/1977 | Bennett et al. . |
| 4,010,448 | 3/1977 | Bennett et al. . |
| 4,025,853 | 5/1977 | Addeo . |
| 4,029,900 | 6/1977 | Addeo . |
| 4,069,510 | 1/1978 | Carlow et al. . |
| 4,075,688 | 2/1978 | Lynch, Jr. et al. . |
| 4,079,455 | 3/1978 | Ozga ................................. 364/200 |
| 4,079,455 | 3/1978 | Ozga . |
| 4,086,627 | 4/1978 | Bennett et al. . |
| 4,087,855 | 5/1978 | Bennett et al. . |
| 4,093,982 | 6/1978 | Heuer et al. . |
| 4,093,983 | 6/1978 | Masog et al. . |
| 4,107,781 | 8/1978 | Barrett ............................. 364/200 |
| 4,118,776 | 10/1978 | Isomura . |
| 4,122,304 | 10/1978 | Mallien . |
| 4,144,411 | 3/1979 | Frenkiel . |
| 4,144,561 | 3/1979 | Tu ..................................... 364/200 |
| 4,153,933 | 5/1979 | Blume, Jr. et al. ............... 364/200 |
| 4,153,933 | 5/1979 | Blume, Jr. et al. . |
| 4,217,638 | 8/1980 | Namimoto ........................ 364/200 |
| 4,220,820 | 9/1980 | Mallien . |
| 4,287,560 | 9/1981 | Forbes ............................... 364/200 |

OTHER PUBLICATIONS

Proceedings of 30th Annual Conference of the IEEE Vehicular Technology Society, International Conference on Transportation Electronics, Sep. 15-17, 1980 Dearborn, MI, published by: Bohn Printing Co., Utica, MI, Table of Contents only.

Portable Telephones for Cellular Systems, by Leitich et al., Motorola, Inc., 9/15/80 80CH1601-copyright 1980 Vehicular Technology Society IEEE, pp. 1-7.

Portable Telephones for 850 MHz Cellular Systems, by R. E. Fisher et al., Bell Laboratories, Whippany, N.J., 9/15/80, 80CH1601-4 copyright 1980 Vehicular Technology Society IEEE, pp. 1-5.

Overview of an A.M.P.S. Mobile Call Processing System by Robt. M. Fuller et al., U.S. Communications Corp., Kent, Wash., 9/15/80-80CH1601-4 copyright 1980 Vehicular Tech. Society IEEE, pp. 1-8.

Mobile Phone, Fit for Pocket May be Near, Wall Street Journal, Sep. 25, 1980.

Motorola, Inc., Instruction Manual-Advanced Mobile Phone System-800 MHz High Capacity Mobile Radiotelephone, 68P81039E25-A, published by Motorola Service Publications, Schaumburg, Illinois-1979, pp. ii-vii and 1-4.

*Primary Examiner*—James D. Thomas
*Assistant Examiner*—James T. Beran
*Attorney, Agent, or Firm*—Rolland R. Hackbart; James W. Gillman

[57] ABSTRACT

A unique microprocessor for controlling portable and mobile cellular radiotelephones is architectured to process high speed supervisory signalling, while also minimizing power drain. The architecture of the microprocessor is organized around three buses, a data bus, a register bus and an address bus. Data signals are routed between the various blocks of the microprocessor by selectively interconnecting the three buses in response to control signals provided by ALU and control programmable logic arrays (PLA). The ALU and control PLA's decode program instructions loaded in instruction register (IR) to provide the appropriate control signals for executing each instruction. The microprocessor also includes three general purpose registers, an arithmetic logic unit (ALU) with two temporary registers and zero and carry flags, serial data bus circuitry including a format generator and two data registers, direct I/O data direction and data registers, a stack pointer counter, a twelve-bit program counter register, a temporary program counter register and associated incrementer, and a temporary address register. Because of the unique architecture of the microprocessor, all instructions can be executed in four or less clock cycles. Moreover, the program counter register, general purpose registers and zero and carry flags are duplicated, and, during interrupts, the microprocessor switches over to the duplicate program counter register, duplicate general purpose registers and duplicate zero and carry flags. As a result, interrupts are processed quickly and efficienty merely by switching back and forth between the program counter register, general purpose registers and zero and carry flags and their duplicates. Since instruction execution time is minimized, the microprocessor can be operated at slower speeds to conserve power drain, while maintaining the through-put necessary for accommodating high-speed, cellular type supervisory signalling. Thus, a microprocessor embodying the present invention can be advantageously utilized in any application where both low power consumption and fast data manipulation are required.

9 Claims, 8 Drawing Figures

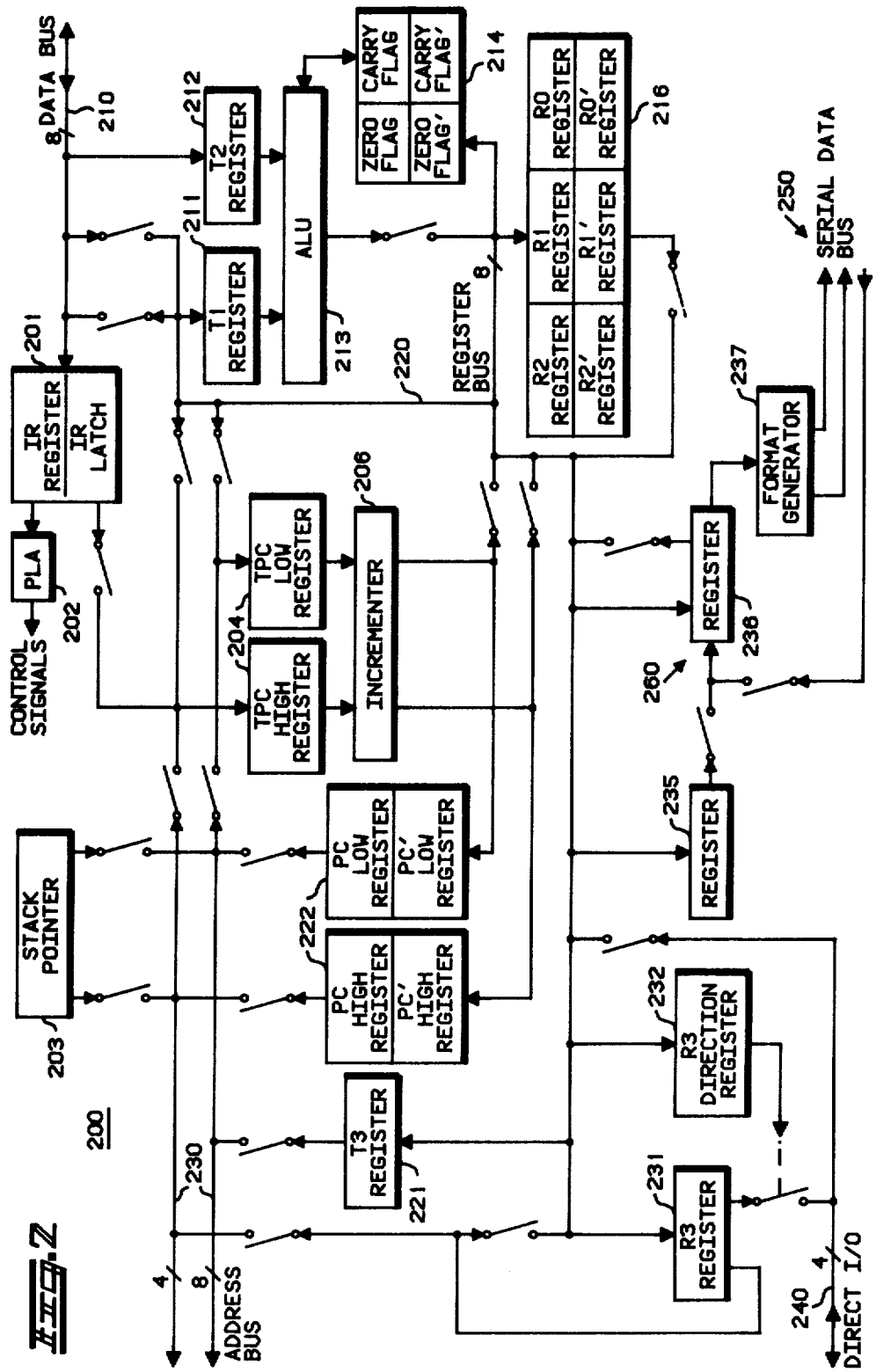

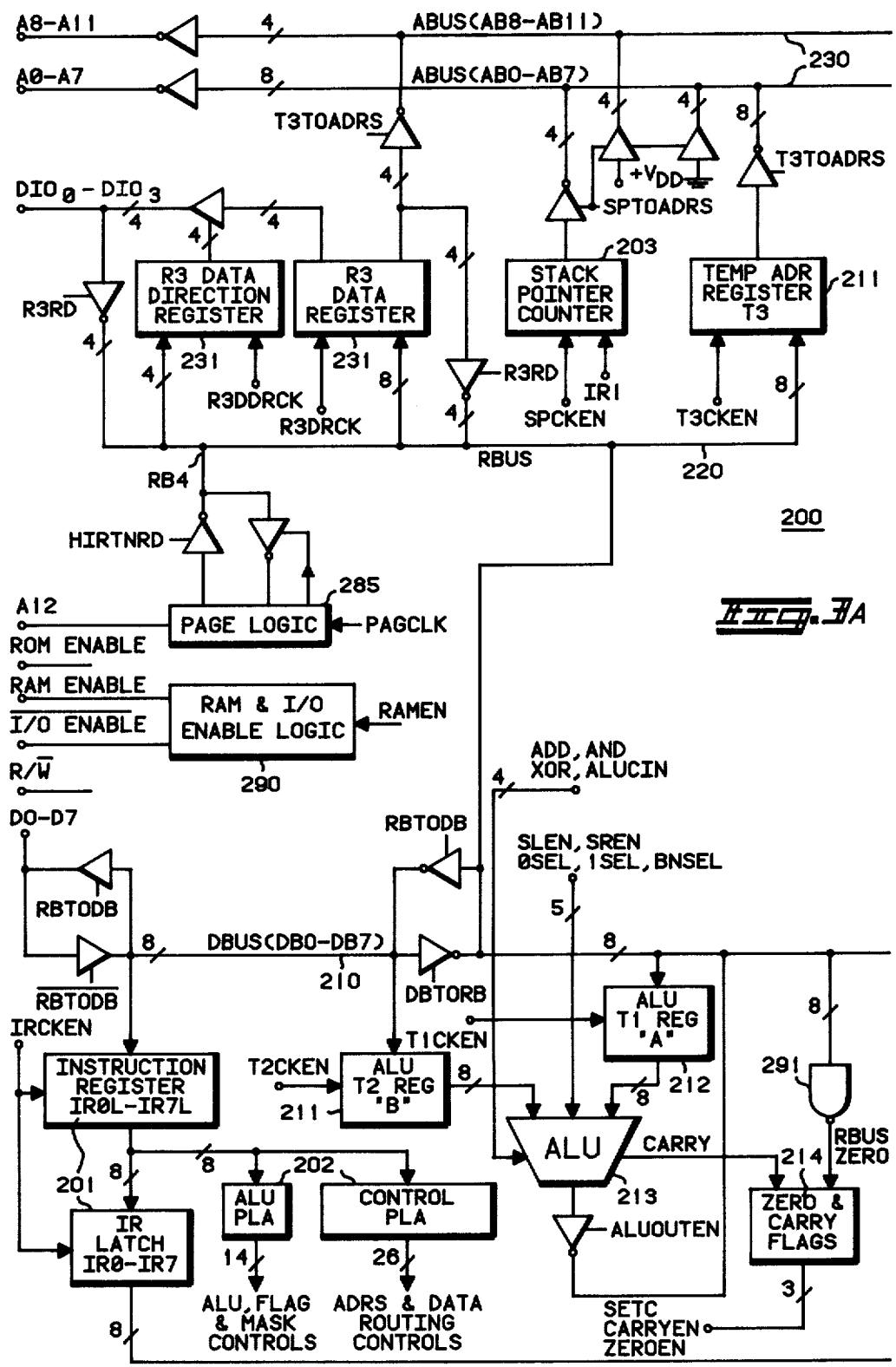

MICROPROCESSOR WITH DUPLICATE REGISTERS FOR PROCESSING INTERRUPTS

RELATED PATENT APPLICATIONS

The instant application is related to the following patent applications filed the same date as and assigned to the same assignee as the instant application: Ser. No. 182,306 now U.S. Pat. No. 4,390,963, by Larry C. Puhl et al., entitled "Interface Adapter Architecture" Ser. No. 187,304, by Larry C. Puhl et al., entitled "Micrprocessor Controlled Radiotelephone Transceiver"; Ser. No. 187,305, by Larry C. Puhl et al., entitled "Keyboard and Display Interface Adapter Architecture"; and Ser. No. 187,303, now U.S. Pat. No. 4,369,516, by John P. Byrns, entitled "Self-Clocking Data Transmission System and Method Therefor". The instant application is also related to U.S. Pat. No. 4,312,074 by Kenneth A. Felix and James A. Pautler, entitled "Improved Method and Apparatus for Detecting a Data Signal Including Repeated Data Words", and U.S. Pat. No. 4,302,845 by John P. Byrns and Michael J. McClaughry, entitled "Phase-Encoded Data Signal Demodulator", both of which were filed on Feb. 7, 1980, and are assigned to the instant assignee. By reference thereto, the foregoing related patent applications are incorporated in their entirety into the instant application.

BACKGROUND OF THE INVENTION

The present invention relates generally to microprocessors, and more particularly to an architecture of a microprocessor that is particularly well adapted for controlling cellular radiotelephone transceivers.

As radiotelephone systems increase in size and complexity to accommodate greater numbers of mobile and portable radiotelephones operating in geographic areas including several large cities or even several states, it is necessary that the control circuitry of these radiotelephones becomes increasingly sophisticated. For example, in cellular radiotelephone systems, mobile and portable radiotelephones must be capable of transmitting and receiving high speed, supervisory signals on dedicated signalling radio channels and also on voice radio channels during conversations. Prior radiotelephone control circuitry, such as that described in U.S. Pat. Nos. 3,458,664 and 3,571,519, does not have the capacity for processing these high speed, supervisory signals required to be received and transmitted during normal operation in such cellular radiotelephone systems. Conventional microprocessors have been integrated into some prior radiotelephones, such as the radiotelephone in U.S. Pat. No. 4,122,304, for providing additional telephone type features, such as automatic telephone number dialing, to radiotelephone subscribers in the present day improved mobile telephone system (IMTS) provided and operated by many telephone companies. However, conventional microprocessors lack the capacity to accommodate the high speed, supervisory signalling encountered in cellular radiotelephone systems, while at the same time monitoring and controlling other portions of the radiotelephone, such as the transmitting and receiving circuitry, a keyboard, and a telephone number display. Moreover, conventional microprocessors having high speed processing capability consume excessive amounts of power, rendering them impractical for use in battery operated mobile and portable radiotelephones.

SUMMARY OF THE INVENTION

Accordingly, it is an object of the present invention to provide an improved microprocessor that provides both high speed processing capability and relatively low power consumption.

It is another object of the present invention to provide an improved microprocessor having a self-clocking serial data bus for accommodating a number of peripheral devices.

It is yet another object of the present invention to provide an improved microprocessor utilizing duplicate registers to enhance the processing of interrupts.

According to the present invention, an improved microprocessor includes a data bus having a plurality of data bus lines, an instruction register coupled to the data bus lines, a programmable logic array for decoding the instruction register signals to provide a plurality of control signals, a register bus having a plurality of register bus lines, an address bus having a plurality of address bus lines, a program counter register switchably coupled to the address bus lines and including a duplicate program counter register switchably coupled to the address bus lines in place of the program counter register during interrupts, a temporary program counter register switchably coupled to the address bus lines and register bus lines and including incrementing circuitry for incrementing the temporary program counter register signals by one in response to the programmable logic array control signals, a plurality of general purpose registers switchably coupled to the register bus lines and including duplicate general purpose registers switchably coupled to the register bus lines in place of the general purpose registers during interrupts, and arithmetic logic circuitry having a first input register coupled to the data bus lines and a second input register coupled to the register bus lines and combining the first and second register signals according to predetermined combinatorial functions selected by programmable logic array control signals. The arithmetic logic circuitry performs both arithmetic and logical functions, such as, for example, binary addition and binary ANDing.

BRIEF DESCRIPTION OF THE DRAWINGS

FIG. 2 is a general block diagram of a microprocessor embodying the present invention.

DETAILED DESCRIPTION OF THE PREFERRED EMBODIMENT

Figure 1:
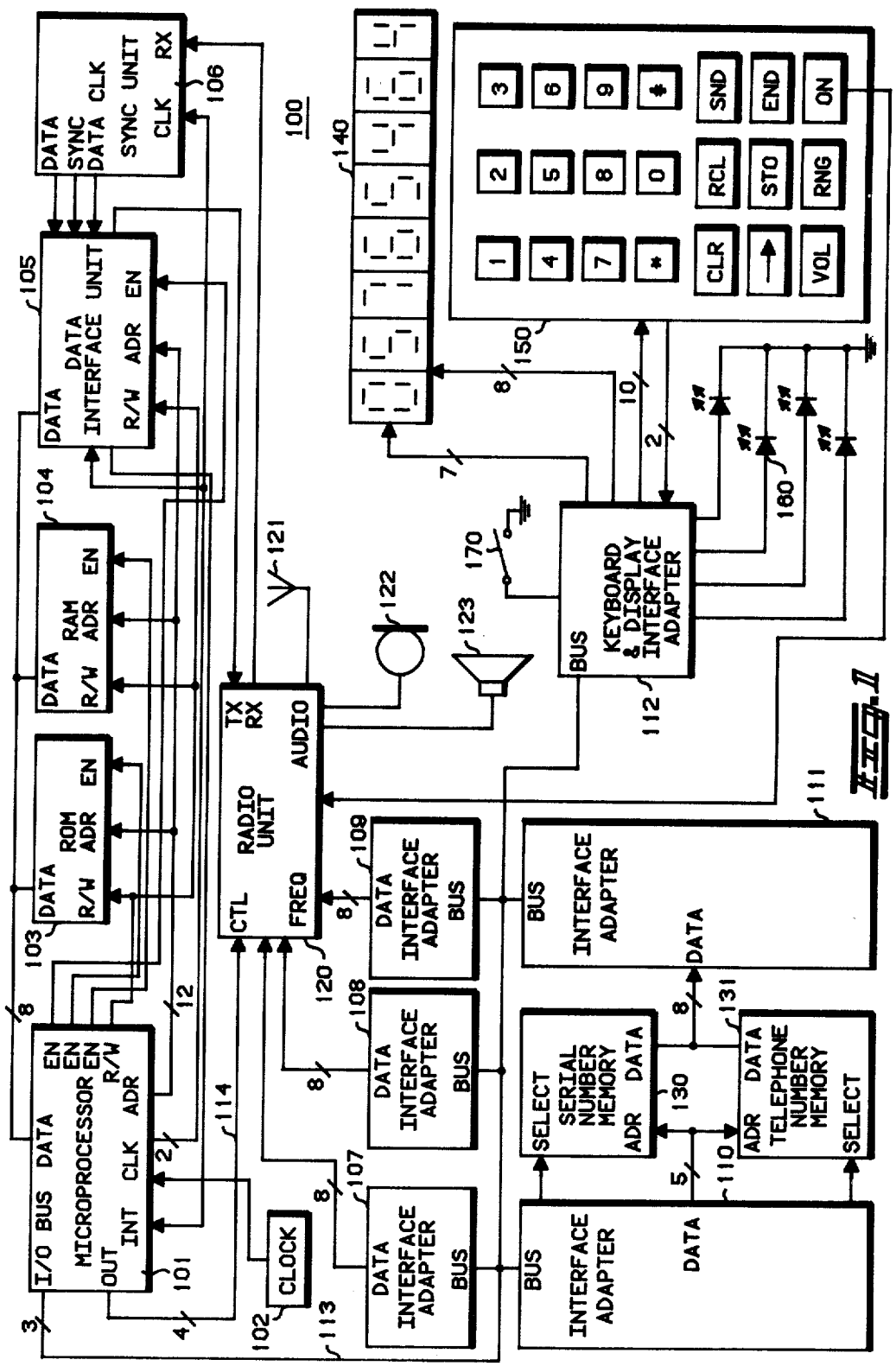
FIG. 1 is a block diagram of a radiotelephone that may advantageously utilize a microprocessor embodying the present invention.

Referring to FIG. 1, there is illustrated a block diagram of a radiotelephone 100 suitable for use in cellular radiotelephone systems of the type described in U.S. Pat. No. 3,906,166 and in a developmental cellular system application, filed by Motorola and American Radio-Telephone Service, Inc. under Docket No. 18262 with the Federal Communications Commission in February, 1977. The radiotelephone 100 provides the same type of fully automatic telephone service to a mobile or portable operator that is provided to land line subscribers. Radiotelephone service is provided over a wide geographical area by dividing the area into a number of cells. Each cell typically has a base station which provides a supervisory signalling radio channel and a number of voice channels. Calls are placed to, and originated by, radiotelephones over the supervisory signalling channel in each of the cells. Upon completion of the supervisory signalling, the radiotelephone is assigned a voice channel and switches from the signalling channel to the voice channel for the duration of the cell. In the event that a radiotelephone leaves a cell and enters another cell, the radiotelephone is automatically switched over to an available voice channel in the new cell. The supervisory signals carried on the signalling channel, and on voice channels for handing off a radiotelephone as it changes cells, are provided by digital signals encoded in a suitable format, such as Manchester Coding, and transmitted at a relatively high speed, such as 10 kHz. The format and transmission of the digital signals is described in more detail in the aforementioned co-pending applications Ser. Nos. 119,605 and 119,350, now U.S. Pat. Nos. 4,312,074 and 4,302,845.

In order to accommodate the high speed supervisory signalling in such cellular radiotelephone systems, the radiotelephone 100 includes a microprocessor 101 together with peripheral devices 103–112, a synthesized radio unit 120, serial number and telephone number memories 130 and 131, a telephone number display 140, a keyboard 150 and status indicating LED's 160. Microprocessor 101, embodying the present invention, is responsive to a control program stored in a read-only memory (ROM) 103 for receiving data signals from the radio unit 120 by way of synchronization unit 106 (described in detail in co-pending application Ser. No. 119,350, now U.S. Pat. No. 4,302,845) and data interface unit 105 for storage in random access memory (RAM) 104, and transmitting to radio unit 120 supervisory data signals stored in RAM 104 by way of data interface unit 105.

Microprocessor 101 is also coupled to radio unit 120 directly by four control signals 114, one for powering up the radio unit, two for controlling the frequency synthesizer and one for sensing audio signals applied to microphone 122, and also by way of serial data bus 113 and interface adapters 107–109 (described in further detail in co-pending application Ser. No. 187,306, now U.S. Pat. No. 4,390,963. Microprocessor 101 is coupled to interface adapters 107–109 by serial data bus 113, which includes two forward data signal lines and a reverse data signal line (described in further detail in co-pending application Ser. No. 187,303, now U.S. Pat. No. 4,369,516. Data signals applied to the forward data signal lines are received by interface adapters 107–109 and applied to radio unit 120. Interface adapter 107 provides audio control signals to the receiver of radio unit 120 for selecting one of two received audio signals if the radio unit includes two antennas 121 for space diversity purposes, controlling the volume of the received audio signal, and muting the received audio signal to provide a conventional squelch type function.

Interface adapter 108 provides audio control signals to the transmitter of radio unit 120 for controlling the RF power of the transmitted signal, muting the transmitted audio signal and powering up the transmitting circuitry. Interface adapter 109 applies an eight-bit frequency control signal to the frequency synthesizer of radio unit 120 for determining the transmitting and receiving frequencies thereof. The frequency control signal applied to the frequency synthesizer can be expanded to up to fourteen bits by utilizing two direct control signals 114 from the microprocessor 101 to select between seven high order bits and seven low order bits. Radio unit 120 can be any conventional radio unit suitable for cellular system operation, such as the radio described in Motorola Instruction Manual 68P81039E25, published by Motorola Service Publications, Schaumburg, Ill., 1979. The radiotelephone described in the aforementioned instruction manual is a frequency synthesized radio specially adapted for cellular radio telephone systems.

Microprocessor 101 is also coupled by way of the serial data bus 113 to interface adapters 110 and 111 for accessing a serial number and telephone number assigned to the radiotelephone 100. The serial number and telephone number of the radiotelephone 100 are stored in separate memories 130 and 131, respectively, so that each may be changed simply by replacing one memory with another. The serial number and telephone number may include a plurality of digits which are each stored in successive locations of these memories. In order to access each digit of the serial number or telephone number, the microprocessor 101 transmits an address data signal by way of the serial data bus 113 to interface adapter 110. The address signal received by interface adapter 110 is applied to the serial number memory 130 and telephone number memory 131. The address signal includes one bit for selecting between the serial number memory 130 and telephone number memory 131 and five bits for selecting the particular digit of the serial number or telephone number. The digit of the serial number or telephone number need out from the addressed serial number memory 130 or telephone number memory 131 is applied to interface adapter 111 which occupies the readout digit to the serial data bus 113 for transmission back to the microprocessor 101.

Microprocessor 101 is also coupled by way of the serial data bus 113 to a keyboard and display interface adapter 112 (described in further detail in co-pending application Ser. No. 187,305). The keyboard and display interface adapter 112 provides for the display of eight digits of an entered telephone number in display 140, scans the keyboard 150 for activated keys and activates status indicating LED's 160, one indicating that the radiotelephone is in the roam mode, another that the radiotelephone is in use, another that no service is available to the radiotelephone and the last that the radiotelephone is locked preventing unauthorized use. The keyboard and display interface adapter 112 scans the keys of the keyboard 150, monitors off-hook switch 170 and applies a data signal to the serial data bus 113 indicating which keys are found to be activated and whether the off-hook switch 170 is activated or not. The keyboard and display interface adapter 112 also receives data signals transmitted by the microprocessor 101 on the serial data bus 113 for display in the telephone number display 140 or for activating one of the four status LED's 160.

The radio unit 120 of the radiotelephone 100 may be either a mobile unit as described in the aforementioned Motorola Instruction Manual 68P81039E25 or a handheld portable unit of the type described in U.S. Pat. Nos. 3,906,166 and 3,962,553, and illustrated in U.S. Pat. No. D234,605. The microprocessor 101 and associated peripheral devices 103-112 are of the type that may readily be integrated into a semiconductive substrate, such as CMOS, and provided individually or together on an integrated circuit. The microprocessor 101 and related peripheral devices 103-112 have been architectured such that the high priority supervisory signals received and transmitted by radio unit 120 are handled on a high speed interrupt basis by data interface unit 105 and synchronization unit 106, while the lower priority control signals for the radio unit 120, display unit 140, keyboard 150 and status LED's 160 are handled on a lower speed basis by way of the serial data bus 113 interface adapters 107-112. Since the serial data bus 113 is self-clocking and independent of the speed of transmission, interface adapters 107-112 can be physically located remote from microprocessor 101 without any degradation in performance. Thus, interface adapters 107-109 may be located in the radio unit, if desired, and the keyboard and display interface adapter 112 may be located on the same printed circuit board as the telephone number display 140 and keyboard 150, both being physically separated from the printed circuit board on which microprocessor 101 is located. Further details as to the exact description and construction of the transmitting and receiving circuitry in a typical radio unit 120 can be found in the aforementioned Motorola Instruction Manual 68P81039E25.

Referring to FIG. 2, there is illustrated a general block diagram of a microprocessor 200 embodying the present invention. Microprocessor 200 is an eight-bit microprocessor that may be constructed on an integrated circuit utilizing conventional silicon gate CMOS technology to provide relatively low power consumption. Microprocessor 200 is architectured such that the bit manipulations required by high speed supervisory signalling, such as that required in cellular type radiotelephone systems, can be quickly and efficiently accommodated. Thus, microprocessor 200 can be advantageously utilized in any application where both low power consumption and fast data manipulations are required.

The architecture of microprocessor 200 is organized around three buses, data bus 210, register bus 220, and address bus 230. Data signals are routed between the various blocks of microprocessor 200 by selectively interconnecting the three buses 210, 220 and 230 in response to control signals provided by ALU and control programmable logic arrays (PLA) 202. PLA's 202 decode program instructions loaded in instruction register (IR) 201 to provide the appropriate control signals for executing each instruction in Table I hereinbelow. The various control signals provided by PLA's 202 are described in further detail hereinbelow with reference to FIGS. 3A and 3B and FIG. 4.

Microprocessor 200 also includes three general purpose registers 216, R0, R1 and R2, an arithmetic logic unit (ALU) 213 with two temporary registers 211 and 212, T1 and T2, and zero and carry flags 214, serial data bus circuitry 260 including format generator 237 and registers 235 and 236, a special purpose register 232, R3, a stack pointer counter 203, a twelve-bit program counter register 222, a temporary program counter register 204 and associated incrementer 206, and a temporary address register 221, T3. All of the registers in microprocessor 200 are latching type registers since a full clock cycle interval is allowed for transfers between registers.

The unique architecture of the inventive microprocessor 200 insures that instructions are executed in a minimum number of clock cycles. For example, the loading of the instruction register 201 with the next instruction from memory via data bus 210 can occur at the same time that the results of the last instruction are being written by way of the register bus 220 into the appropriate register. As a result of the unique architecture of the microprocessor 200, all instructions in Table I hereinbelow can be completed in four or less clock cycles. Thus, the inventive microprocessor 200 can be operated at slower speeds to reduce power consumption, while maintaining the through-put necessary for accommodating high-speed, cellular type supervisory signalling.

Another feature of the unique architecture of microprocessor 200 is that interrupts are serviced in a minimum number of clock cycles because general purpose registers 216, condition flags 214 and program counter register 222 include primary and duplicate registers (indicated by primes in FIG. 2). Thus, the primary set of registers 216 and 222 and flags 214 is used during normal operation, and the duplicate set is used during interrupts. By utilizing duplicate registers 216 and 222 and duplicate condition flags 214, a considerable amount of processing time is saved since microprocessor 200 does not have to store the contents of the registers and condition flags before transferring to the interrupt service subroutines. Thus, during an interrupt, the duplicate registers 216 and 222 and duplicate conditions flags 214 are used by microprocessor 200, while the contents of the primary registers and flags remain unchanged. After processing the interrupt, microprocessor 200 switches back to the primary registers 216 and 222 and flags 214, returning to normal operation in at most two clock cycle intervals.

Another feature of the unque architecture of microprocessor 200 is that the R0, R1, R2 and R3 registers 216 and 231 may be directly controlled by the control program in ROM 103 in FIG. 1. Of the R0, R1 and R2 registers 216, the R1 and R2 registers are multipurpose registers which can be used as address pointer or data registers, and the R0 register is a single purpose register which can be used as a data register only. R3 registers 231 is also a special purpose register, whose four least significant bits are used for page addressing when accessing data from ROM 103 or RAM 104 in FIG. 1 and whose four most significant bits are used to control the four direct I/O lines 240.

Another feature of the unique architecture of microprocessor 200 is that seven levels of subroutine nesting are allowed. For each level of nesting, the subroutine return addresses are saved in a stack, addressed by stack pointer counter 103 and located in the upper sixteen bytes of page zero of RAM 104 in FIG. 1. These locations of RAM are reserved for access only by jump to subroutine JSR and return from subroutine RTS instructions (see Table I hereinbelow). When using the rest of the instruction set of microprocessor 200, accessing these locations of RAM will result in activation of the I/O enable line to data interface unit 105 rather than the RAM enable line to RAM 104 in FIG. 1. This operation of microprocessor 200 is utilized to uniquely address up to sixteen different I/O devices, such as data interface unit 105 in FIG. 1, when the I/O enable lline is activated.

The unique architecture of microprocessor 200 also provides for two condition flags 214, the zero flag and carry flag. The zero flag is set to a binary one state if the result of an arithmetic operation in ALU 213 is zero, and it is otherwise cleared to a binary zero state. The carry flag has a binary one state if a carry has resulted from an arithmetic operation in ALU 213 or if a high order binary one bit has been shifted out of ALU 213 during a shift operation. Microprocessor 200 includes four conditional jump instructions, JEQ, JNE, JCC, JCS (see Table I hereinbelow), for responding to the binary zero or one state of the zero and carry flags 214.

According to another unique feature of the architecture of microprocessor 200, serial data bus circuitry 260 provides bidirectional communications between microprocessor 200 and a number of interface adapters 107-112 in FIG. 1 by way of serial data bus 250. Sixteen-bit data signals are loaded into registers 235 and 236 and applied according to a self-clocking transmission scheme by format generator 237 to serial data bus 250 for transmission to the interface adapters. The particular interface adapter addressed by the sixteen-bit data signal transmits a return data signal on the serial data bus 250, which is loaded into register 236 while the last eight bits of the sixteen-bit data signal are being transmitted. Data transmission on the serial data bus 250 is completely under control of microprocessor 200, which polls the various interface adapters on a time available basis. Since the self-clocking transmission scheme is insensitive to speed and timing variations, microprocessor 200 can interrupt data transmission on the serial data bus 250 for long periods of time (seconds, minutes, etc.) without affecting the transmission or reception of the data signals. The data bus circuitry 260 and the self-clocking transmission scheme are described in further detail in the aforementioned co-pending application, Ser. No. 187,303, now U.S. Pat. No. 4,369,516.

Figure 3B:
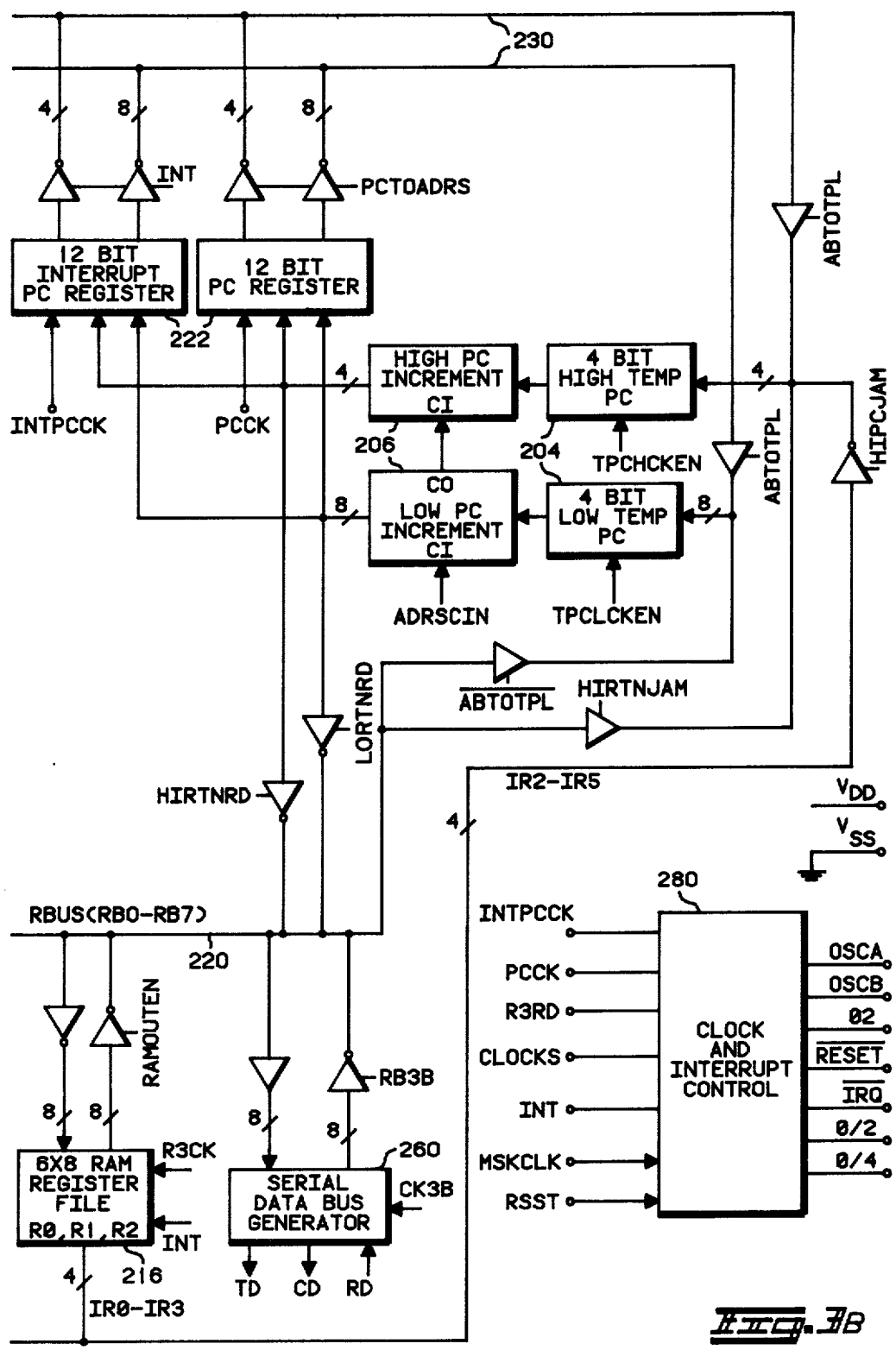
FIG. 3, including FIGS. 3A and 3B taken together, is a more detailed block diagram of the microprocessor in FIG. 2.

Referring to FIGS. 3A and 3B taken together, there is illustrated a more detailed block diagram of microprocessor 200, showing the specific control signals applied to each block by PLA's 202. PLA's 202 decode the signals from instruction register 201 to provide arithmetic control signals and address and data routing control signals. The circuitry of PLA's 202 is described in more detail with reference to FIG. 4 hereinbelow. The function of the various input and output signals of microprocessor 200 is described in Table IV hereinbelow.

ALU 213 operates on signals from T1 register 212 and T2 register 211 in accordance with selected arithmetic and logical combining functions. For example, the ALU can be shifted left SLEN, shifted right SREN, perform additions ADD, perform logical ANDing AND, or perform logical exclusive ORing XOR. The T1 and T2 register 212 is enabled to receive signals from register bus 220 by the TICKEN signal, while the T2 register 211 is enabled to receive signals from the data bus 210 by the T2CKEN signal. The output of the ALU 213 is applied to register bus 220 in response to the ALUOUTEN signal.

Some instructions require the ALU input from T2 register 211 to be modified. The $\phi$SEL control signal forces the ALU input from T2 register 211 to be all zero, the 1SEL control signal forces the ALU input from T2 register 211 to be all ones, the BNSEL control signal causes the contents of the T2 register 211 to be logically complemented. Some instructions require that the carry input to the ALU 213 be a binary one. This is done by setting the ALUCIN control signal to a binary one state.

The timing for ALU 213 is such that the inputs are latched in registers 211 and 212 during one clock cycle and the ALU output is loaded into RAM 216 during the next clock cycle. This timing scheme simplifies the design of registers 211 and 212 and RAM 216, because they need not have master/slave operation. Master/slave operation is not required since, in effect, registers 211 and 212 are the master part, and RAM 216 is the slave part of a composite master/slave register. Another advantage of this configuration is that a maximum amount of time is allowed for propagation delay through ALU 213, since data is presented to ALU 213 during one clock cycle and used during the next clock cycle. However, this unique timing feature of ALU 213 does not increase the number of clock cycles required for implementing an ALU instruction since the data bus 210 and register bus 220 are separate, allowing the loading of RAM 216 by way of the register bus 220 to overlap the loading of instruction register 201 with the next instruction from ROM 103 in FIG. 1 via the data bus 210.

Carry and zero flag flip-flops 214 receive a carry signal from ALU 213 and a register bus zero signal from NAND gate 291, respectively. The carry flag flip-flop is set in response to the SETC signal and enabled by the CARRYEN signal, while the zero flag flip-flop is enabled by the ZEROEN signal. The carry flag flip-flop is set by the SEC instruction, cleared by the CLC instruction and tested when executing the JCC and JCS jump instructions (see Table I hereinbelow). The zero flag flip-flop is tested when executing the JEQ and JNE jump instructions.

The R0, R1 and R2 registers 216 are provided in a 6×8 RAM register file, which is clocked by the R3CK signal. Selection between the R0, R1 and R2 registers is determined in response to the IR0–IR3 signals from instruction register latch 201. The selected register R0, R1 or R2 is applied to the register bus 220 in response to the RAMOUTEN signal. When an interrupt is executed, the duplicate R0', R1' and R2' registers are selected in response to the INT signal and used instead of the R0, R1 and R2 registers.

Serial data bus generator 260 receives two eight-bit data signals from the register bus 220 in response to the CK3B signal for transmission by means of the serial data bus lines, TD, CD and RD, to various interface adapters 107-112 in FIG. 1. Serial data bus generator 260 includes two registers 235 and 236 and a format generator 237 as illustrated in FIG. 2. Data is serially shifted out of the two registers and applied to the serial data bus by the format generator in response to the CK3B signal. Since the serial data bus is self-clocking, the speed at which the data signals are applied to the serial data bus can be varied. Thus, it is not critical that microprocessor 200 provide the CK3B signal at regular intervals.

The clock and interrupt control signals necessary for each of the blocks of the microprocessor are provided by block and interrupt control logic 280. The frequency of operation of the microprocessor is determined by the OSCA and OSCB signals which may be supplied by a clock source 102 in FIG. 1 that may typically be a crystal oscillator. The clock and interrupt control logic includes a divider for dividing the OSCA/B signal to provide an $\phi/2$ signal to the various blocks of the microprocessor and φ/2 and φ/4 signals which are coupled to data interface unit 105 and synchronization unit 106 in FIG. 1. The clock and interrupt control circuitry is responsive to the IRQ signal for providing the INT signal during interrupts, the RESET signal for resetting the various circuitry of microprocessor 200 to an initial state, the RSST signal for resetting the ST10 and the ST20 signals and the MSKCLK signal for masking and unmasking interrupts. Further details of the circuitry in the clock and interrupt control logic are provided hereinbelow with reference to FIG. 7.

The program counter register 222 is loaded in response to the PCCK clock signal with the contents of the temporary program counter register 204 by way of increment 206. During interrupts the PCCK clock signal is disabled and the INTPCCK clock signal is enabled for loading and interrupt program counter register 222 with the contents of the temporary program counter 204. Thus, switching between the program counter register and interrupt program counter register 222 is accomplished by controlling the PCCK and INTPCCK clock signals. Disabling the PCCK clock signal saves the contents of the program counter register 222 until the PCCK signal is re-enabled at the end of the interrupt. Signals from the program counter register and interrupt program counter register 222 are applied to the address bus by the PCTOADRS signal and INT signal, respectively, and routed back to the temporary program counter register 204 to be incremented by incrementer 206 to provide the next instruction address. However, if the next instruction address is to be modified, signals from the register bus 220 are coupled to the temporary program counter register 204 in response to the $\overline{\text{ABTOTPL}}$, HIRTNJAM, or HIPCJAM signals. The program counter register signals are normally incremented by one to provide the next instruction address. However, during jump instructions, transfer to and from interrupt instructions and transfer to and from subroutine instructions (see Table I hereinbelow), the next instruction address is modified by loading the temporary program counter register 204 by way of the register bus 220.

The T3 temporary address register 221 is loaded from the register bus 220 in response to the T3CKEN signal. Eight bits of the T3 register 221 and four bits from the R3 data rights 231 are applied to the address bus 230 in response to the T3TOADRS for addressing various peripherals, such as ROM 103, RAM 104 and data interface unit 105 in FIG. 1.

The stack pointer counter 203 is incremented and decremented depending on the state of IR1 from instruction register latch 201 when enabled by the SPCKEN signal. Because the stack pointer counter 203 can be both incremented and decremented, the stack pointer can be changed without the need for additional instructions for incrementing or decrementing the stack pointer in ALU 213. The stack pointer counter 203 points to a sixteen-byte stack at addresses 0E0 to 0FF (in hexadecimal) in RAM 104 in FIG. 1, which contains return addresses that are loaded into the program counter register 222 when returning from subroutines. When gated to the address bus 230 by the SPTOADRS signal, the stack pointer 203 addresses two eight-bit locations in RAM 104 in FIG. 1 for storing a thirteen-bit return address for each of seven possible levels of subroutine nesting.

The operation of stack pointer counter 203 aids in reducing the number of execution cycles for the jump to subroutine JSR and return from subroutine RTI instructions. Stack pointer counter 203 is a four-bit up/down counter. Thus, since stack pointer counter 203 can be both incremented and decremented without using data bus 210 or register bus 220, both the data bus 210 and register bus 220 are available for other operations during the time that stack pointer counter 203 is being incremented or decremented. Thus, the data bus 210 and register bus 220 can be used for storing the subroutine return address into RAM 104 in FIG. 1, while decrementing the stack pointer counter 203 during a jump to subroutine JSR instruction.

The R3 data direction register 232 and R3 data register 231 are utilized to provide four direct I/O signals from microprocessor 200. Four bits of the R3 data register 231 contain the binary states of signals to be applied to the direct I/O signals, and four bits contain the high order bits associated with temporary address register 221. The binary state of the signals loaded into R3 data direction register 232 determine whether or not the direct I/O signals are inputs or outputs. If a binary one bit is loaded into data direction register 232, the corresponding direct I/O signal is an output and the binary state from the corresponding bit of data register 231 is applied thereto. The binary states of the direct I/O signal and the address bits in R3 data register 231 are applied to the register bus 220 in response to the R3RD signal.

The page logic 285, described in further detail with reference to FIG. 5 hereinbelow, controls the state of address bus signal A12 for selecting a particular page of memory in ROM 103 or RAM 104 in FIG. 1. The state of the A12 signal is applied to RB4 of the register bus 220 in response to the HIRTNRD signal.

The RAM and I/O enable logic 290, described in further detail with reference to FIG. 6 hereinbelow, is responsive to the RAMEN signal for providing either the RAM enable signal or the I/O enable signal depending on the address applied to address bus 230. The RAM enable signal is applied to RAM 104, while the I/O enable signal is applied to the data interface unit 105 in FIG. 1.

Figure 4:
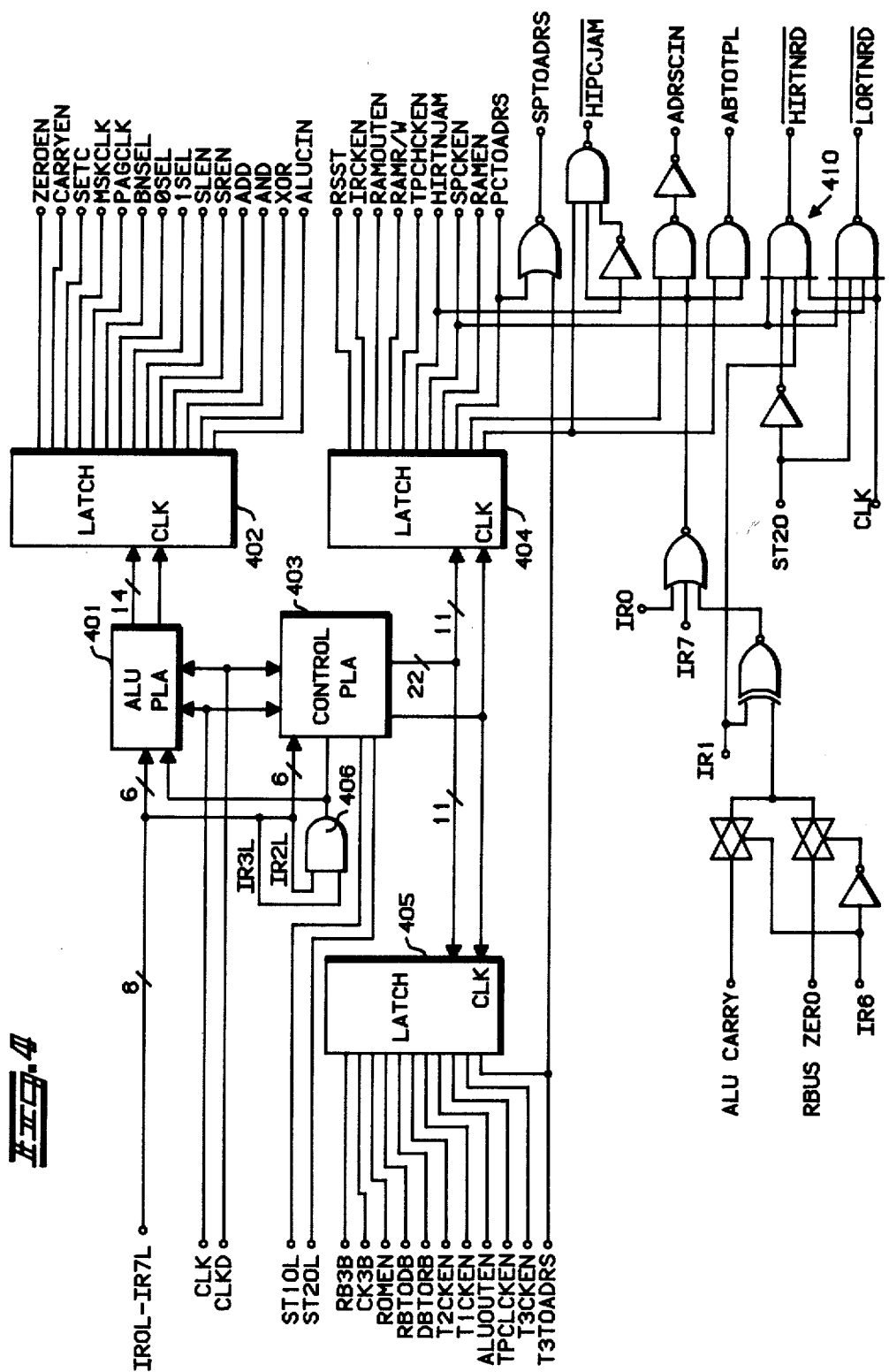
FIG. 4 is a detailed circuit diagram of the ALU and control programmable logic arrays in FIG. 3A.

Referring to FIG. 4, there is illustrated a detailed circuit diagram for the ALU and control PLA's 202 in FIG. 3A. In FIG. 4, the control PLA 403 and ALU PLA 401 may be any conventional programmable logic array loaded in accordance with hexadecimal data in Tables V and VI, respectively, hereinbelow.

The control PLA 403 and ALU PLA 401 are responsive to the CLK and CLKD clock signals for reading out signals stored at locations addressed by the IR0L-IR7L signals from instruction register 201 in FIG. 3A. The signals applied to the rows of the AND array (see Table V) of the ALU PLA 401 are IR0L, IR1L, IR2L ANDed with IR3L, IR4L, IR5L, IR6L and IR7L. Similarly, the signals applied to the rows of the AND array (see Table VIA) of the control PLA 403 are ST20L, ST10L, IR7L, IR6L, IR5L, IR4L, IR2L ANDed with IR3L, IR1L and IR0L. The read-out control signals from PLA 401 (from rows of the OR array in Table V) are loaded into latch 402, while the read-out control signals from PLA 403 (from rows of the OR array in Table VIB) are loaded into latch 404 (rows 1-11 in Table VIB) and latch 405 (rows 12-22 in Table VIB). The control signals from latches 402, 404 and 405 are applied to blocks of microprocessor 200 as indicated in FIGS. 3A and 3B. Several additional control signals are provided by gating circuitry 410 depending upon the particular instruction being executed and the binary state of the carry and zero flags.

Figure 5:
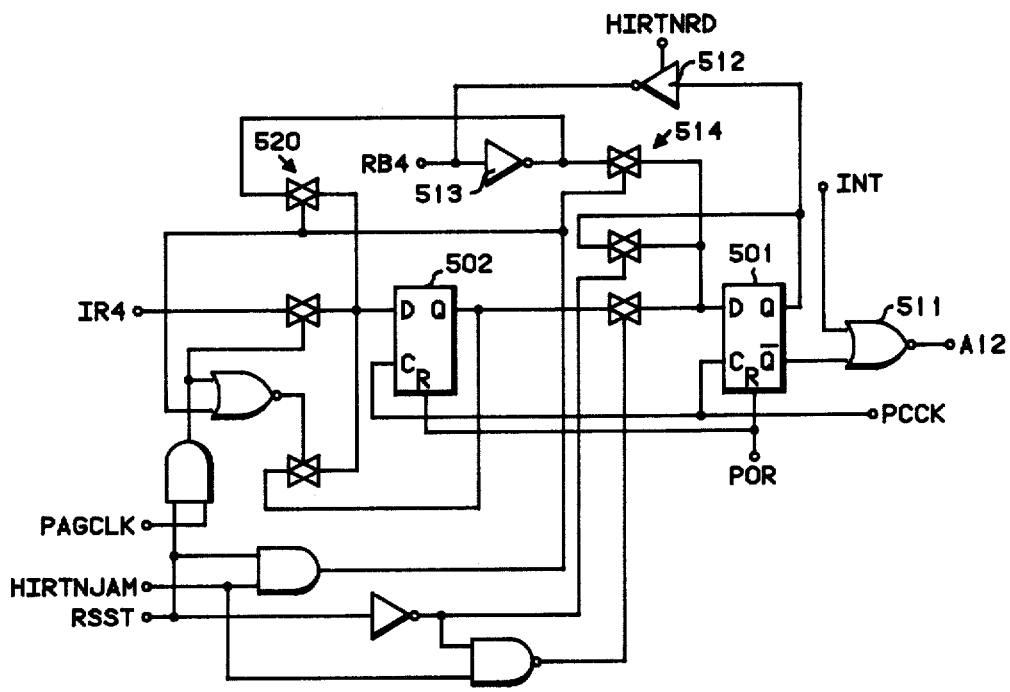
FIG. 5 is a detailed circuit diagram of the page logic circuitry in FIG. 3A.

Referring to FIG. 5, there is illustrated in more detail the page logic 285 in FIG. 3A. Flip-flop 501 stores the page bit which is applied together with the INT signal to A12 of the address bus by NOR gate 511. Thus, during interrupts, A12 is forced to a binary zero state by the INT signal. The page bit from flip-flop 501 is applied to RB4 of the register bus via gate 512 in response to the HIRTNRD signal. The page bit of flip-flop 501 is loaded by RB4 via gate 513 and transmission gates 514 when both the RSST and HIRTNJAM signals have a binary one state. The page bit in flip-flop 501 is recirculated via transmission gates 514 when the RSST signal has a binary zero state. When the RSST signal has a binary one state and the HIRTNJAM signal has a binary zero state, the page bit in flip-flop 501 is loaded from flip-flop 502. At the same time that the page bit in flip-flop 501 is loaded with RB4, flip-flop 502 is likewise loaded with RB4 via transmission gates 520. Flip-flop 502 is loaded with IR4 from the instruction register when both the PAGCLK signal and the RSST signal have a binary one state. Otherwise, the output of flip-flop 502 is recirculated by transmission gates 520.

Figure 6:
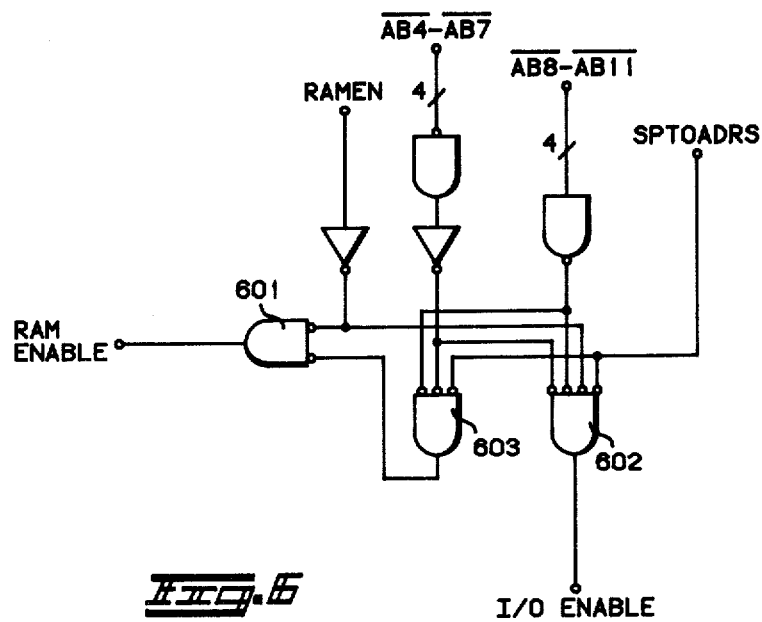
FIG. 6 is a detailed circuit diagram of the RAM and I/O enable logic circuitry in FIG. 3A.

Referring to FIG. 6, there is illustrated in more detail the RAM and I/O enable logic 290 in FIG. 3A. The RAM enable signal is provided by the microprocessor when accessing either RAM 104 or data interface unit 105 in FIG. 1. Depending on the binary state of the address bus lines AB4–AB11 and the SPTOADRS signal, either the RAM enable signal is provided or the I/O enable signal is provided. If AB4–AB7 all have a binary one state, AB8–AB11 all have a binary zero state and the SPTOADRS signal has a binary zero state, then gate 602 provides a binary one state of the I/O enable signal. When the I/O enable signal has a binary one state, up to sixteen I/O devices, such as data interface unit 105 in FIG. 1, can be addressed by the low order bits of the address bus, AB0–AB3, applied thereto. The subroutine return address stack in RAM 104 in FIG. 1 is also assigned to the same addresses as the I/O devices. Thus, when the contents of the stack pointer counter 203 in FIG. 3A are applied to the address bus in response to the binary one state of the SPTOADRS signal, the I/O enable signal from gate 602 is forced to a binary zero state and the RAM enable signal is provided with a binary one state by gate 601 since gate 603 is also forced to a binary zero state by the binary one state of the SPTOADRS signal. For all other addresses, the RAM enable signal is provided with a binary one state by gate 601.

Figure 7:
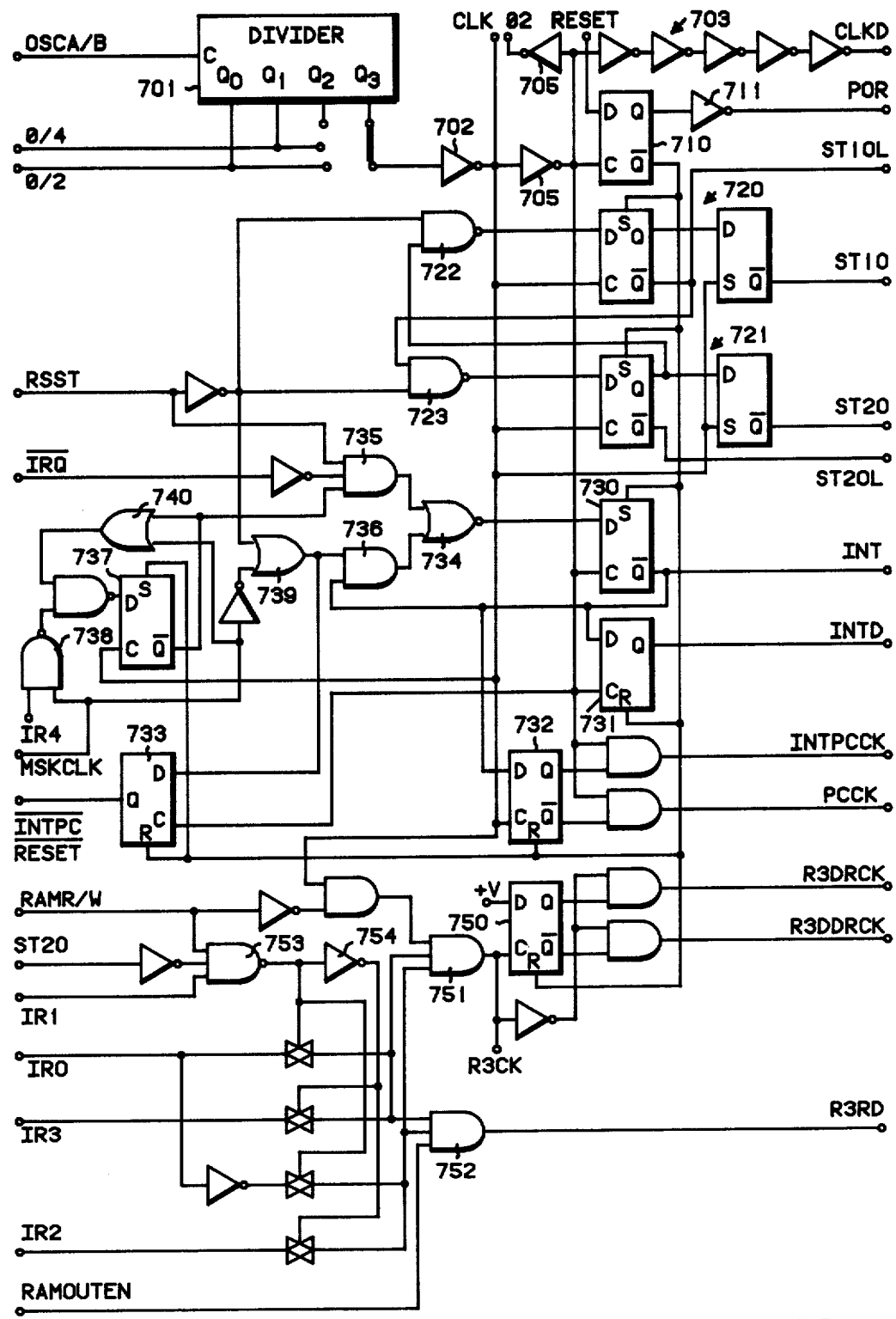
FIG. 7 is a detailed circuit diagram of the clock and interrupt control circuitry in FIG. 3B.

Referring to FIG. 7, there is illustrated in more detail the clock and interrupt control circuitry 280 in FIG. 3B. The external clock signals OSCA and OSCB, provided typically by a crystal oscillator or other suitable clock source, are coupled by appropriate circuitry to divider 701. The first two stages of divider 701 provide the $\phi/2$ and $\phi/4$ clock signals which are coupled to selected peripheral devices. The operating frequency of the microprocessor can be changed by strapping gate 702 to one of the four stages of the divider 701. Thus, the microprocessor clock frequency can be made slower to reduce power dissipation depending on the timing requirements of a particular system. In the preferred embodiment of the present invention, gate 702 is coupled to the fourth stage of divider 702, providing 0.24 MHz clock signal when the OSCA/B clock signals have a nominal frequency of 3.84 MHz. Gate 702 provides clock signal CLK, which is coupled to gates 704 and 705 to provide clock signal $\phi 2$ and coupled by gates 704 and 703 to provide a delayed clock signal CLKD. The various clock signals are distributed throughout the blocks of microprocessor 200 in FIGS. 3A and 3B.

Flip-flop 710 is coupled to a reset signal for providing via gate 711 an initial reset signal POR for initializing all of the registers, latches and flip-flops in the various blocks of microprocessor 200 in FIGS. 3A and 3B. Circuitry is typically coupled to the reset signal that provides a momentary pulse whenever the microprocessor power supply is turned on. The POR signal also causes a predetermined address to be loaded into the program counter register 22 in FIG. 3B for causing the microprocessor to execute an initialization routine stored thereafter.

Flip-flops 720 and 721 are each arranged as master-/slave flip-flops for providing up to four states for each instruction, where each state corresponds to a clock cycle interval. For an instruction requiring four clock cycle intervals, the ST10 signal from flip-flop 720 has a binary one state during the second and third clock cycle intervals, and the ST20 signal from flip-flop 721 has a binary one state during the third and fourth clock cycle intervals. Both flip-flops 720 and 721 are reset to the binary zero state via NAND gate 722 and 723 by the RSST signal. The RSST signal has a binary one state during the last cycle interval of each instruction, resetting the ST10 and ST20 signals to the binary zero state for the following instruction.

A peripheral device may cause the microprocessor to execute an interrupt by placing a momentary binary zero state on the IRQ signal bus. The IRQ signal bus is coupled to each peripheral device that is serviced by the interrupt subroutine of the microprocessor, such as the data interface unit 105 in FIG. 1. The binary zero state on the IRQ signal bus is coupled via gates 734 and 735 to flip-flop 730, causing the INT signal to have a binary one state. Gate 735 is enabled by the RSST signal during the last clock cycle interval of each instruction. In addition, gate 735 is disabled by the output of interrupt mask flip-flop 737, providing for the masking of interrupts under program control. The INT signal from flip-flop 730 is maintained at a binary one state by way of gate 736 and 734 until an RTI instruction (see Table I hereinbelow) is executed. The RTI instruction results in a binary one state of the MSKCLK signal which by way of gate 739 causes the INT signal from flip-flop 730 to be reset to the binary zero state. If it is desired to mask interrupts by setting the interrupt mask flip-flop 737, an SEI instruction is executed, setting the output of the interrupt mask flip-flop 737 to a binary zero state by way of gate 738. The output of the interrupt mask flip-flop 737 is maintained at a binary zero state by way of gate 740. If it is desired to remove the masking of interrupts, the output of the interrupt mask flip-flop 737 can be set to a binary one state by executing a clear interrupt instruction CLI. In order to return from an interrupt subroutine, execution of the CLI or SEI instruction resets the interrupt flip-flop 730 by way of gate 739 and also provides a reset signal INTPCRESET from flip-flop 733 for resetting the interrupt program counter register 222 in FIG. 3B to address 001. Flip-flop 731 provides an interrupt signal INTD that is delayed by one clock cycle from the INT signal provided by flip-flop 730.

During the execution of an interrupt, the alternate registers 222 and 216 and alternate carry and zero flags 214 in FIG. 1 are utilized by the microprocessor. Switching from the program counter register to the interrupt program counter register 222 in FIG. 3B is accomplished by flip-flop 732 which, in response to the INT signal, enables the INTPCCK signal and disables the PCCK signal. Thus, during interrupts, the interrupt program counter register 222 in FIG. 3B is clocked by the INTPCCK signal, while the disabled PCCK signal holds the program counter register 222 in FIG. 3B in the latched state. The contents of the program counter register are saved until the end of the interrupt, when the INTPCCK signal is disabled and the PCCK signal is re-enabled.

Flip-flop 750 is initially reset by the POR signal and enables the R3DDRCK signal so that the data direction register 232 in FIG. 3A may be loaded to define which of the direct I/O signals are inputs and outputs. Once the data direction register has been loaded, flip-flop 750 changes state and enables the R3DRCK signal for loading the R3 data register 231. Gates 751-754 decode the direct I/O instructions, providing the R3CK signal at the output of gate 751 and the R3RD signal at the output of gate 752. The contents of the lower half of the R3 data register 231 in FIG. 3A and the state of the direct I/O signals is applied to the register bus 220 in FIG. 3A in response to the R3RD signal from gate 752. The R3CK signal from gate 751 is the clock signal for the R0, R1 and R2 registers 216 in FIG. 3B.

The instruction repertoire of the microprocessor is shown in Tables I, II and III hereinbelow. The microprocessor has six addressing modes, immediate, direct, pointer, inherent, extended and register, each of which is described in Table III. These addressing modes gives the microprocessor a great amount of flexibility, resulting in more efficient and simpler control programs. A control program is included in Table VII, hereinbelow, which is loaded into ROM 103 in FIG. 1 for enabling the microprocessor to control the operation of a portable radiotelephone in a cellular radiotelephone system of the type described in the aforementioned Motorola Instruction Manual 68P81039E25 and in the aforementioned Motorola developmental cellular system application.

The microprocessor in FIGS. 3A and 3B can be constructed of conventional integrated circuit devices, such as the CMOS devices described in the CMOS Integrated Circuits Book, published by Motorola Semiconductor Products, Inc., Austin, Tex., 1978. Furthermore, the microprocessor in FIGS. 3A and 3B can be constructed with electrical circuit devices suitable for integration into a semiconductive substrate, such as CMOS, and provided in a single integrated circuit device.

In summary, a unique microprocessor has been described that is architectured to efficiently process high speed supervisory signalling, while also minimizing power consumption. Instruction execution times are minimized through the use of data, address and register buses for allowing instruction overlap, a stack pointer counter having incrementing and decrementing capability, an arithmetic logic unit having separate input registers and duplicate program counter registers, general purpose registers and zero and carry flags for use during interrupts. The unique processor further includes a self-clocking serial data bus for bidirectional communications to peripheral units on a low priority basis. Since the initiation and timing of the data communications on the serial data bus can be varied under program control, the microprocessor can accommodate high speed supervisory signalling on a high priority interrupt basis, while handling the data communications on the serial data bus on a time available basis. Thus, the inventive microprocessor is a very powerful signal processor and controller that can be advantageously utilized in any application where both low power consumption and fast data manipulation are required.

TABLE I

| BASIC INSTRUCTIONS | | |
|---|---|---|
| NMEMONIC | FUNCTION | HEXADECIMAL FORMATS |
| ADD | Add | B0-BB |
| AND | AND | D0-DB |
| BIT | Bit test | C0,C4,C8,CC |
| CLC | Clear carry | 4D |
| CLI | Clear interrupt mask | 2D |
| CLR | Clear | 8D,8F,01,05,09 |
| CMP | Compare | A0,A4,A8,AC |
| COM | Complement (1's) | ED,EE,EF,61,65,69 |
| DEC | Decrement | AD,AE,AF,21,25,29 |
| INC | Increment | 9D,9E,9F,11,15,19 |
| JCC | Jump if carry clear | 02 |
| JCS | Jump if carry set | 00 |
| JEQ | Jump if equal zero | 40 |
| JMI | Jump indirect | BD,BE,BF,31,35,39 |
| JMP | Jump unconditional | 03 |
| JNE | Jump if not equal zero | 42 |
| JSR | Jump to subroutine | 43 |
| LDA | Load immediate or from RAM | 80-8C |
| LOD | Load from ROM | 91,92,93,95,96,97,99,9A,9B |
| ORA | Inclusive or | F0-FC |
| PAG | Load $A_{12}$ address bit | 6D = SET,7D = RESET |
| ROL | Rotate left | CD,CE,CF,41,45,49 |
| ROR | Rotate right | DD,DE,DF,51,55,59 |
| RTI | Return from interrupt | 2D |
| RTS | Return from subroutine | 0D |
| SDO | Send data to serial data bus | 71,75,79 |
| SEC | Set carry | 5D |
| SEI | Set interrupt xask | 3D |
| SNO | Test serial bus activity | 1D |
| STA | Store accumulator | C1-CB |
| SUB | Subtract | A1-AB |

TABLE I-continued

BASIC INSTRUCTIONS

| NMEMONIC | FUNCTION | HEXADECIMAL FORMATS |
|---|---|---|
| XOR | Exclusive OR | E0-EC |

TABLE II

REGISTER-TO-REGISTER INSTRUCTIONS

All register-to-register instructions are two bytes long and are coded according to the table below:

| Source | R0 | R1 | R2 | R3 | |
|---|---|---|---|---|---|
| 1st Byte | 90 | 94 | 98 | 9C | |
| Destination | R0 | R1 | R2 | R3 | OP CODE |
| 2nd Byte | 80 | 84 | 88 | 8C | LDA |
|  | A0 | A4 | A8 | AC | CMP |
|  | B0 | B4 | B8 | BC | ADD |
|  | C0 | C4 | C8 | CC | BIT |
|  | D0 | D4 | D8 | DC | AND |
|  | E0 | E4 | E8 | DC | XOR |
|  | F0 | F4 | F8 | FC | ORA |

TABLE III

ADDRESS MODES

Immediate

The second byte of the instruction contains the operand.

Direct

The second byte of the instruction contains the low 8 bits of the memory address. The high 4 bits are determined by the contents of the least significant 4 bits of R3.

Pointer

R1 or R2 contains the low 8 bits of the memory address. The high 4 bits are determined by the contents of the least significant 4 bits of R3.

Inherent

Does not require memory address.

Extended

First and second byte of instruction combines to form a 12-bit address for both conditional and unconditional jumps.

First Byte: OP3, OP2, $A_{11}$, $A_{10}$, $A_9$, $A_8$, OP1, OP0

Second Byte: $A_7$, $A_6$, $A_5$, $A_4$, $A_3$, $A_2$, $A_1$, $A_0$

Register-to-Register

The operation is between the designated source and designation registers with the result going into the destination register.

TABLE IV

MPU SIGNAL DESCRIPTION

ROM ENABLE—Strobes external ROM.
RAM ENABLE—Strobes external RAM.
I/O ENABLE—Strobes external I/O.
$A_0$-$A_{12}$—Address outputs which are used to address peripherals.
$DIO_0$-$DIO_3$—Software programmable I/O lines directly controlled by the contents of R3.
TD, CD, RD—True data, complement data and return data signal lines of self-clocking serial data bus.
RESET—Low level resets the processor.
OSCA, OSCB—Crystal Inputs, nominal frequency = 3.84 MHz
IRQ—This level sensitive input requests that an interrupt sequence be generated within the microprocessor. After completing the current instruction, the microprocessor will switch control and use the interrupt registers, the interrupt program counter, and the interrupt condition codes. Interrupts can be masked in the microprocessor if desired.
$\phi 2$—This output is the system clock and is used for strobing/clocking ROM, RAM and other I/O
$D_0$-$D_7$—Bi-Directional Data Bus
R/W—The Read/Write line is an output which signals peripherals and memory devices whether the MPU is in a Read (binary one) or Write (binary zero) state. The normal standby state of this signal is Read (binary one).
$\phi/2$—This output has a frequency of ½ the frequency of OCSA/B.
$\phi/4$—This output has a frequency of ¼ the frequency of OSCA/B.
$V_{DD}$—+V supply connection.
$V_{SS}$—Ground connection.

TABLE V

ALU PLA AND ARRAY

| 1 | 1 | A | 5 | B | 0 | 6 | 9 | 7 |
|---|---|---|---|---|---|---|---|---|
| 0 | 4 | 0 | 0 | 0 | 2 | 8 | 2 | 0 |
| 0 | 2 | 0 | A | 4 | 8 | 0 | 0 | 8 |
| 1 | 5 | A | 0 | A | 2 | A | A | 7 |
| 1 | 9 | 8 | 8 | A | 5 | 2 | 8 | 0 |
| 0 | 2 | 0 | 7 | 1 | 8 | 4 | 1 | F |
| 0 | 2 | 2 | 0 | 3 | 9 | 6 | 0 | 0 |
| 1 | 1 | 1 | 7 | C | 6 | 1 | F | 8 |
| 0 | D | 0 | 0 | 0 | 6 | 1 | F | B |
| 1 | 2 | 2 | 7 | E | 1 | E | 2 | 4 |
| 0 | 0 | C | 1 | F | 9 | 8 | C | 6 |
| 1 | F | 2 | 6 | 0 | 6 | 7 | 2 | 1 |
| 0 | E | 5 | F | 5 | F | D | 7 | 8 |
| 1 | 1 | 0 | 0 | C | 0 | 2 | 8 | 7 |

OR ARRAY

| 1 | F | F | 8 | 0 | 0 | 0 | 0 | 0 |
|---|---|---|---|---|---|---|---|---|
| 1 | C | 0 | 7 | F | 8 | 0 | 0 | 4 |
| 1 | 0 | 0 | 6 | 0 | 0 | 0 | 0 | 4 |
| 0 | 0 | 0 | 0 | 0 | 0 | 0 | 0 | 1 |
| 0 | 0 | 0 | 0 | 0 | 0 | 0 | 0 | 2 |
| 0 | 0 | 0 | 0 | 0 | 6 | 0 | 0 | 0 |
| 1 | 2 | 0 | 7 | F | 8 | 6 | 2 | 0 |
| 0 | 1 | 0 | 0 | 0 | 0 | 0 | 9 | 8 |
| 0 | 0 | 0 | 1 | C | 0 | 0 | 0 | 0 |
| 0 | 0 | 0 | 0 | 3 | 8 | 0 | 0 | 0 |
| 0 | F | 0 | 0 | 0 | 0 | 7 | 0 | 0 |
| 1 | 0 | 0 | 6 | 0 | 1 | 8 | 0 | 0 |
| 0 | 0 | 0 | 0 | 0 | 1 | 0 | C | 0 |
| 0 | 2 | 0 | 0 | 0 | 2 | 6 | 0 | 0 |

TABLE VIA

CONTROL PLA AND ARRAY

| 0 | 0 | 4 | 0 | 0 | 0 | 1 | 4 | 8 | E | 0 | 0 | 0 | 3 | 0 | 0 | 0 | 1 | E |
|---|---|---|---|---|---|---|---|---|---|---|---|---|---|---|---|---|---|---|
| 1 | 0 | 0 | 1 | 8 | 0 | 0 | 7 | 1 | F | E | 3 | F | C | F | 9 | 8 | 7 | E | 1 |
| 1 | 1 | E | 1 | 0 | 1 | F | E | 0 | 7 | 0 | 0 | 0 | 0 | 5 | 8 | 7 | 8 | 1 | E |
| 2 | E | 0 | E | F | E | 0 | 0 | C | 8 | 0 | 0 | 2 | 3 | F | 8 | 6 | 0 | 0 | 2 | 0 |
| E | F | F | F | F | F | E | 0 | 0 | 0 | 0 | 0 | 0 | 0 | 0 | 0 | 0 | 0 | 0 | 0 |

TABLE VIA-continued
CONTROL PLA AND ARRAY

| 0 | 0 | 0 | 0 | 0 | 0 | 1 | F | F | F | F | F | F | F | F | F | F | F | F | F |
|---|---|---|---|---|---|---|---|---|---|---|---|---|---|---|---|---|---|---|---|
| 0 | 3 | 2 | F | C | 2 | 8 | 1 | 3 | 4 | 0 | 1 | 1 | C | 2 | 0 | 0 | 0 | 1 | C | 0 |
| 3 | 4 | 0 | 0 | 2 | 5 | 0 | 2 | 0 | 0 | 5 | 2 | 8 | 2 | 8 | 2 | C | 9 | 8 | 1 | 0 |
| 0 | 0 | 0 | 1 | 8 | 2 | 5 | 1 | 3 | 5 | 0 | 0 | 9 | 0 | 2 | 6 | 0 | 0 | 1 | C | 0 |
| 0 | 0 | 2 | 8 | 5 | 4 | 4 | 2 | 0 | 0 | A | 9 | 0 | D | 4 | 0 | 3 | 0 | 0 | 0 | 8 |
| 0 | 0 | 0 | 1 | 8 | 2 | 5 | 0 | 2 | 0 | 0 | 5 | 9 | 0 | 2 | 3 | 0 | 6 | 0 | 8 | 5 |
| 0 | 0 | 2 | 4 | 4 | C | 8 | B | 4 | 0 | 0 | 0 | 2 | C | 0 | 0 | 0 | 0 | 1 | 0 | 0 |
| 0 | 0 | 1 | 1 | 8 | 3 | 8 | 0 | 6 | 3 | 0 | 0 | 7 | F | C | 5 | 8 | 7 | 8 | 0 | 0 |
| 0 | 2 | 0 | 0 | 7 | C | 2 | 2 | 1 | 0 | 0 | 0 | 0 | 0 | 0 | 2 | 1 | 8 | 7 | C | 0 |
| 2 | 0 | 0 | 1 | B | F | E | B | 9 | 0 | 0 | F | 0 | 0 | 3 | 8 | 6 | 0 | 0 | 0 | 0 |
| 1 | 5 | 4 | 2 | 0 | 0 | 0 | 0 | 6 | F | 9 | 0 | 0 | 8 | C | 0 | 0 | 2 | C | 6 | 1 |
| 0 | 8 | 8 | 0 | 0 | 0 | 0 | 1 | 0 | 0 | 0 | F | 0 | 0 | 2 | 0 | 6 | 0 | 0 | 0 | 0 |
| 1 | 4 | 0 | 1 | B | E | 8 | 2 | 0 | 0 | 6 | 0 | 7 | 7 | 1 | C | 0 | 5 | 2 | 8 | 2 |

TABLE VIB
CONTROL PLA OR ARRAY

| 3 | A | 0 | F | 0 | 0 | 0 | 0 | 3 | 1 | 0 | C | 1 | C | 2 | 1 | F | 8 | 4 | 0 | 0 |
|---|---|---|---|---|---|---|---|---|---|---|---|---|---|---|---|---|---|---|---|---|
| 0 | 1 | C | 0 | 0 | 1 | 7 | 9 | 0 | 4 | 0 | 0 | 0 | 0 | 0 | 0 | 0 | 0 | 0 | 1 | E |
| 0 | 0 | 0 | 0 | 3 | 8 | 0 | 1 | 0 | 8 | 0 | E | 0 | 0 | 0 | 0 | 7 | 8 | 0 | 0 | 0 |
| 3 | F | F | 0 | 0 | 0 | 0 | 1 | F | F | F | F | C | 0 | 0 | 0 | 0 | 0 | 0 | 0 | 0 |
| 1 | 9 | 8 | 3 | 0 | 1 | 6 | D | 8 | 4 | 0 | 0 | 0 | 0 | 0 | 0 | 0 | 0 | 0 | 1 | E |
| 0 | 0 | 0 | 1 | 0 | 0 | 0 | 0 | 0 | 0 | 0 | 0 | 0 | 0 | 0 | 0 | 0 | 0 | 0 | 0 | 0 |
| 0 | 4 | 0 | 0 | 0 | 2 | 0 | 0 | 0 | 0 | 0 | 0 | 0 | 0 | 0 | 0 | 0 | 0 | 0 | 0 | 0 |
| 0 | 4 | 0 | 1 | 8 | 0 | 0 | 0 | 4 | 1 | F | 0 | 3 | 0 | 0 | 4 | 0 | 0 | 0 | 8 | 1 |
| 1 | 9 | 8 | 2 | 0 | 1 | 6 | D | 8 | 4 | 0 | 0 | 0 | 0 | 0 | 0 | 0 | 0 | 0 | 1 | E |
| 1 | 8 | 0 | 2 | 4 | 0 | 0 | 0 | 0 | 0 | 0 | 0 | 0 | C | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 8 | 2 | 0 | 0 | 0 | 0 | 0 | 0 | 0 | 0 | 0 | 0 | 0 | 0 | 0 |
| 0 | 0 | 0 | 0 | 0 | 4 | 0 | 0 | 0 | 0 | 0 | 0 | 0 | 0 | 0 | 0 | 0 | 0 | 0 | 0 | 0 |
| 1 | 9 | C | 2 | 0 | 1 | 7 | 9 | 8 | 4 | 0 | 0 | 0 | 0 | 0 | 0 | 0 | 0 | 1 | 1 | E |
| 0 | 4 | 0 | 0 | 0 | 0 | 0 | 2 | 1 | 0 | E | 1 | 0 | 0 | 7 | 8 | 0 | 0 | 0 | 0 | 0 |
| 1 | 8 | 0 | 3 | 8 | 0 | 0 | 0 | 5 | 0 | 0 | 0 | 2 | F | F | 0 | 0 | 0 | 0 | 4 | 0 |
| 0 | 0 | 0 | 0 | 0 | 0 | 0 | 0 | 3 | 0 | 0 | E | 1 | 8 | 2 | 8 | 7 | 8 | 4 | 2 | 0 |
| 2 | 0 | 0 | C | 0 | 0 | 0 | 1 | E | 0 | 0 | 0 | 3 | F | C | 0 | 0 | 0 | 6 | 0 | 0 |
| 0 | 1 | E | 0 | 0 | 1 | 7 | 0 | 2 | 5 | 0 | 0 | 1 | 0 | 0 | 4 | 0 | 7 | 8 | 1 | E |
| 1 | 9 | 8 | 2 | C | 1 | 6 | D | 8 | 4 | 0 | 0 | 0 | C | 0 | 0 | 0 | 0 | 0 | 1 | E |
| 0 | 0 | 0 | 0 | 0 | 0 | 0 | 0 | 8 | 8 | 0 | 0 | 0 | 0 | 0 | 0 | 0 | 0 | 0 | 0 | 0 |
| 0 | 0 | 0 | 0 | 0 | 0 | 0 | 0 | 5 | 1 | E | 0 | 0 | 0 | 0 | C | 0 | 0 | 4 | 0 | 1 |

TABLE VIIA ROM

| ADDRESS | DATA |
|---------|------|
| 0000 | 393D8CE08CCF010B031A172E176C1788179B176C1B251B2D1B2D1F1B821B9236 |
| 0020 | 1BF1231B23272354236F23EA23F82710277A278A278F4127A627B827C727DA2B |
| 0040 | 174E2B5D2B662BC02BC82BCF2F1B532F822F905A2F9E2FA82FEE613303330E33 |
| 0060 | 3B66337133A86B2F262F2909378FAAAAAAAAAAAAAAAAAAAAAAAAAAAAF12C1C2C3C4 |
| 0080 | C5C600761FAAAAAAAAAF12D9DADBDCDDDE008520AAAAAAAB89DFC1C2C3C4C5C6 |
| 00A0 | 009A1FC7C8C9CACBCC00A320CDCECFD0D1D200AC21D3D4D5D6D7D800B522D9DA |
| 00C0 | DBDCDDDE00BE23507F51FF52FF535454FF55F056FF572048F700021200000000 |
| 00E0 | 0000000000000000000000000000000000000000000000000000000000000000 |
| 0100 | 6D81F2D1F34104594104244106238DF29D1385114418AD118510441EAD104106 |
| 0120 | 239D142D8586442B8DF12D8925C925974440A4C0063BD43FB42586C5F19D252D |
| 0140 | AD244448199B072DB8029B8005C1248B462D81F3D0BFC1F32D81F085F3C40244 |
| 0160 | A4856BE548C41046938856B96C8790D4F3C3B8058394F0D7C3B805F7C7816AA0 |
| 0180 | 044693B805C7A16C46938436C5F357769D0B2D9D6C896CA80546A38D6CED6B46 |
| 01A0 | A39D6A2D8459A51106A3896AB96BC3896B46BDC56C8059C1118001C172817285 |

TABLE VIIA ROM-continued

| ADDRESS | DATA |
|---|---|
| 01C0 | 7494C044DCB86D857394C044D08F07DC87B56CC7A45A06DCE174C1744DCD729D |
| 01E0 | 6B816BA00546F781F3C04044EF8DF18574A41F44F84FEC2D9D0B81F3F001C1F3 |
| 0200 | 2DBCFF099794B0194A04CC0F4A01A0004A7E88EF8198A0E24A228199A0B84A22 |
| 0220 | 8897988480FFC3A34A7EB8FF08249E824A7EB4FF082E80E2C19880B8C19988C7 |
| 0240 | 9719931 97FA1A8D94A40FC208D7A8021C17B884984034B83814BC00248648080 |
| 0260 | F149C149884584044B83882C84054B83884B84144B83A000489880E07FA13DDC |
| 0280 | 7F0B7EC50F8457817B7F51C3B17AC17A9D7B19AD0F4A870D854B814C7366C54B |
| 02A0 | C14C94F0487A854D814E7366C54DC14E94F0487A883184054B8380E07F51D0F0 |
| 02C0 | C38825853281314DCD36CD35CD34CD3345410AD8E053E490294AC8087EA0004A |
| 02E0 | 7EC5328136C00F4A7E57EE8148C16B80AEC1F3C1F18002C1102D01114AFB57EE |
| 0300 | 3D81104A7E8156A0AE4A7E017F61DCDF7F16AD1780817F8F77B58593D40FE54F |
| 0320 | 4E188594E5504E1880417F8F9D009D0A7F108009C10C2D810BC0014C3F4F8181 |
| 0340 | 144C688D149D159D9788188115D01F4E538816834C57AF19A81D4E53811E4E66 |
| 0360 | 811D4C68AD1DAD1E890C850D9D0D93C10C824C689084D40F4D452594B843000F |
| 0380 | 37D0C0C10B85F3C40252368D738D748005C172C16B846CB56B8AB97380FFC183 |
| 03A0 | 8073C1848184B08D0EAC9D83C1848583736698A04CBF1198A04CBF0CA4AD72CD |
| 03C0 | 74AD6B4E958172A003100C9D738408A5734E8D80EFC17388718390A40EE49084 |
| 03E0 | 8173C174295DDD730CD985748D6B8851800190C44CFDB80541A0104EF2C96AC1 |

40

TABLE VIIB ROM

| ADDRESS | DATA |
|---|---|
| 0400 | 7390E4C57481F3D0FEC1F30DA0054EEA808E735088518D0F018761B805D3D7B8 |
| 0420 | FBE3B805C3F50FC50FD10FA8651219C3B8EDA85612168567C57C8568C57D8569 |
| 0440 | C57E881C856581664DCD7ECD7DCD7C41451257E453E09029524894F890F85087 |
| 0460 | 73668805C97C8801D40F5270A001508155511278E40AE09C4D491268AD7C5266 |
| 0480 | 0D8464B57CEACA8001C18781F3C002542D811152978D0B8165A0C010F7A08010 |
| 04A0 | DBA04010B18585562B53C2562B9D871729850B562B53C2562D8080C10B80FAC1 |
| 04C0 | 110DE145D00F562D8566E546562D8567E547562D8168E148D0F00D850BC48054 |
| 04E0 | 2B856645414541E12FD03F562BE530D4F0562B9D8713AD8168D0305420B0F054 |
| 0500 | 2DB0F05419850BC440542B57298804C97584658004B86D3BB2095711804013BB |
| 0520 | 09570F850BC480562D9D878D0B0D8916564A818CD0DFF0407F8F818854488D00 |
| 0540 | FC20275B8805C9167F84017F7C57EE88088F29A80056518D868802C9009D0389 |
| 0560 | 4BC983894CC9848015C1820D8103562D800CC1199D0080B68D6B8D6C8D6A8456 |

TABLE VIIB ROM-continued

| ADDRESS | DATA |
|---|---|
| 0580 | 8E15A465568017F0679F56948119562D11C1000D80B4C1199D000D679FA00256 |
| 05A0 | 8C816EE14AD0FE56F3816DE149D00F56F35B758D85816FD03CB01C8480C57B85 |
| 05C0 | 7554D08173D080C17B8172D0F8B008515151D01FC182B17BC17B854D894E8185 |
| 05E0 | 54E6854B894CC583C9849D009D038033C1F30D5B665A0581768577C178C57980 |
| 0600 | 20C18517B5816EE179D0FE5A1F816DE178D00F5A1F81788579C176C57717FF81 |
| 0620 | 6D856E1B7D679F548C80781796679FA002568C5B66583F8100A008542E17988D |
| 0640 | 009D01818CD0DFB1857F8F817558578173D07F11C17A0D8170856F41454145D4 |
| 0660 | 0FB415C57A0D816EE177D0FE562D816DE176D00F0D8149854AC176C577C178C5 |
| 0680 | 790D807DC1168404C5198002C10180407F868919544489165AA2B0801444C101 |
| 06A0 | AD16818858AA80411BC4679F542D8404C51921542D215ABF816FC04056440D21 |
| 06C0 | 5AC98021C1028D010D8165A0B0162D6FF658EDA07058E9A050562D801EC11280 |
| 06E0 | 01C1098050C11E8D1D80111BC480A11BC4FC208445882780047BB28800848081 |
| 0700 | 02C0405C19F408B410C922893ED80F5C1788BEC922B41088B5C91FC920C92189 |
| 0720 | 6FC8805C33A0115C33F404B41088ACC920C91FA0215C4DC0405C458949C8805E |
| 0740 | 4589855C4DF402B41088A3C91FC526D4708126C0025C5D812C6314C12C8126C0 |
| 0760 | 045C6981326314C13289225C7981386314C138813ED00FC13E058102A0115E8C |
| 0780 | 856845454545D40380D51F8E8055C12E812DD0F094B0C12D88F0C91885186073 |
| 07A0 | 894B854CC983C584897AC982897BC8805EC0D87FC90E8584A50EC5841CC0AD83 |
| 07C0 | 8102D0F01111C1029D03882A80F0D3C3C17C2983C17E2983C17D8024C10EB8FE |
| 07E0 | 871983B8034DCF29CF29CF191941451EF5E453E090AD0E5ED57366C719C3857E |

TABLE VIIC ROM

| ADDRESS | DATA |
|---|---|
| 0800 | B8FEC7857D29C7857CB802F7C7B806A8485ECC0DD00FB4F094B00D8103562D80 |
| 0820 | 10C11A9D021776679F6231811A562D1F9C8565E480A440162D01C430604C801F |
| 0840 | C420604C8063C410604C807CC1448009C1199D0201854F5555D43F94B05555D4 |
| 0860 | 0F94B04D5594B04D5594B0C110274685186279C0405444275B679F60818009C1 |
| 0880 | 1981195C9C8110562D81F2C00162AC7F778036C1F3577601854F4D5594B04D55 |
| 08A0 | 94B0555555D40794B0C1100D80107F7C8894C9258005C124842D81F2C001608F |
| 08C0 | 2562BA8076C1F381F2C001608F8525A49C62C781F2C00162DC9D020D8525A49C |
| 08E0 | 62D38524A40462D3238F81F3C040562D57768019C11027468510562D8D187F77 |
| 0900 | 8102A01754448009C1198050C11A2746C040664238588666238450C51A57EE804A |
| 0920 | C1020D851A662CB0FCC1020D679F64498409C519A004562D8165A0B0244F8002 |

TABLE VIIC ROM-continued

| ADDRESS | DATA |
|---|---|
| 0940 | C10757EE8D119D020D8119562D1F9C6FF68902C8406475A040666D84028001C1 |
| 0960 | 09C5128005C11D804BC10217EEA090562D84FA275DA03054440D8507562D8D02 |
| 0980 | C02064879D040D9D060D811A54440D818866976F2F17448109562D8D88174481 |
| 09A0 | 878D87D0FF0D9D038014C11085838184C57FC1808D8117EE9D038110B014C110 |
| 09C0 | 818485836B220D8110562D7F4F66BA81F2C002562D81F19D030D81F2C002562D |
| 09E0 | 8583898481F1A18126F2C57FC980B181C181AD826807AD84A80066FEAD83F584 |
| 0A00 | 68078002C1030D9D038180857F6B228028C11080FF3FA18110562D7F4F6A098D |
| 0A20 | 030D6A28A086162DA4036A2EA020142D8861C90EB4FCB0972A3B15AD0EB05068 |
| 0A40 | 3A2A4415A4006A3B890E84517F51EC409880EC407F51EC80810EEC800D8002C1 |
| 0A60 | 0488C8C9190D810821562D81196C98679F542D8165A0B02ABB6FF6A0306C1FA0 |
| 0A80 | A0688AA0107606801EA001C112810668978D068D887F848414C5198404C50484 |
| 0AA0 | 01C509800AC11D8D1E80F4C18657F08480818AF010D01F94F03F7C9D079D040D |
| 0AC0 | 8107562D11C1040D8119562D9D040D810821562D818868E09D066F2F8D042F06 |
| 0AE0 | 09095444679F542D8165A0B0162D6FF6A0306AFE8006C1048014C1192F04A060 |
| 0B00 | 6E0D6B5D6F2F80B057F08D860DA0A068A3A0107606801EC1122BA38119562D9D |
| 0B20 | 058D048D060D8D1B11851DF51E6E3A800485066E36018D093F61851B6E61E080 |
| 0B40 | C109851288FFA4026E4C880885046C588828C0806E588878C91BC0806E65013F |
| 0B60 | 61C080542D8112542DA113142D8D13818961D08085046C7EF06085EB3F63F040 |
| 0B80 | 3F617F846F2F6BA98048A118C1189D058118562D8D088D057B926F2F17448D16 |
| 0BA0 | 80047F5A9D0633BE850825562DC0806CCF81F3C0406EC56BA98011C1188039C1 |
| 0BC0 | 197F842FCF81186ECF800AC1166FE481886C1F679F542D8165A0B028796FE49D |
| 0BE0 | 079D060D8002C1067F8B73BE2F068107562D11C1060D8167D0018568D4F0C50E |

TABLE VIID ROM

| ADDRESS | DATA |
|---|---|
| 0C00 | B10E0D80756BAB8032C1119D070D8111562D816685674541D0037F7C80047F5E |
| 0C20 | 80306F089D078D088165D030C18180602172308168856773662B0D8110562D7F |
| 0C40 | 4F72338D079D0880D2C11A80907F7301C1118851C96A8001C173C1748D6B8031 |
| 0C60 | C1F380B017F05551555155515551D40F0D73C6A8006C988506A402562D858ACC |
| 0C80 | 1072908084C11CF4CF65542D80F03F73811C729CC430542D80303F79A00C142D |
| 0CA0 | C420542D80A03F7973C681F3C040562DAD08734B810470BEA0056A5D2BA98084 |
| 0CC0 | C11C80603F7381F2C00272FC81F1851070F884AC898170DEB4CEB8F072D894A0 |
| 0CE0 | 32F8B4CE94A030F880C8C11A810670F8810972F880047F5A8020C110891AA8C0 |
| 0D00 | 142D80043F5E85047647A08076318116542D8438882680057BB2098480813ED0 |

TABLE VIID ROM -continued

| ADDRESS | DATA |
|---|---|
| 0D20 | 0FC13E7429888584A08126D00F94B0376E8850841EA050744D88A08402A04074 |
| 0D40 | 4D84FAA090744DA070562D3757C512C91E8D1D8401C509841473664D555155F4 |
| 0D60 | 55C127C5288055C129C12A09809AC126C91F5FCA8504767A6FE4056BB1FC8080 |
| 0D80 | 05C124886EC9259D088D86807417F0814F51CD50DD4F41D080E14FC14F8D0D81 |
| 0DA0 | 8AE0087F7C8197D07F74E7A07376B580807F8D9D97898B851776BE09C98BA486 |
| 0DC0 | 34CB818C61D00274CB7F8D84C07F517A1E890A74EF859690E4D42074FBC196C0 |
| 0DE0 | 2076F37B9237FB818CD07F7F8F37B3C19637FB858876FB7BC58196C040542D81 |
| 0E00 | 95780B8D957F1281893F6D818CC002542D8100F101542D8109562DDCDF0DFC20 |
| 0E20 | 9D9580A0F1EA7F6D8096C11780027F867F53001F7846A00D3862A00B3842C802 |
| 0E40 | 7A9FC8017A4C7F078801C98B842088944DCF2925C4077A51C4FF7A4EF194C194 |
| 0E60 | 3F128D8B850A542DB0F378C521789721788C217889217892B0E9908884D99215 |
| 0E80 | A37A7E92C3F0A03F6D8804A809F802C98B0D8D888D170D8801C98B88903F188D |
| 0EA0 | 8B414141D078B092C80478BD848D90888008C10E82C31519AD0E7AB40D908488 |
| 0EC0 | 8D7BB03F128D38848D88397BB0819478F08404800988404DCF29217AD8257AD3 |
| 0EE0 | 813878D18440884282C32529A43B7AE881887AF89D883F8B8106A002562D8119 |
| 0F00 | 562D8082C1060D888D8F19A8957E090D7F07810A542D8894844083C0F07C2DA0 |
| 0F20 | C03E25B0F0A0B03C2FA0A03E2FE0A0C00F7C44C0087C46C0047C3C21C0017E46 |
| 0F40 | C0027C46E00A7FA11529A4457E1A0D84D17FA11D7E5371C0800DF1893F6161D1 |
| 0F60 | 8985EAD0ED94F0C1898595562D8453E0743FA1F18A3F7C801061D18A8455C18A |
| 0F80 | E0F03FA1801061D18C3F8F8010F18CC18C85887E9FC0027C9FC0807E9F800384 |
| 0FA0 | 481D7EA171750D434F50595249474854203139373920425920 4D4F544F524F4C |
| 0FC0 | 412C20494E432EAA4A2E534D4544494E47484F46462056455253494F4E203220 |
| 0FE0 | 30394E4F56313937390000000000000000000000000000000000000000000000 |

I claim:

1. An improved microcomputer coupled to at least one interrupt signal from a signal source and a clock signal from a signal source, said microcomputer having at least one input signal and at least one output signal and including clock and interrupt control logic coupled to the clock and interrupt signals, respectively, said microcomputer comprising:

data bus means having a plurality of data bus lines for carrying binary signals;

instruction register means having a plurality of signals and being connected directly to the data bus lines for receiving signals therefrom;

programmable logic means coupled to the instruction register means for providing a plurality of control signals in response to the instruction register means signals;

register bus means having a plurality of register bus lines for carrying binary singals;

means for intercoupling the register bus lines and data bus lines in response to predetermined ones of the programmable logic means control signals;

address bus means having a plurality of address bus lines for carrying binary signals;

program counter register means having a plurality of signals and further including duplicate program counter register means coupled in parallel therewith and having a plurality of signals, said program counter register means being switchably connected to the address bus lines in response to predetermined ones of the programmable logic means control signals for applying signals thereto, and said duplicate program counter register means being switchably connected to the address bus lines in place of the program counter register means in response to the interrupt signal;

incrementing means;

temporary program counter register means having a plurality of signals, said temporary program counter register means switchably connected to the address bus lines or register bus lines in response to predetermined ones of the programmable logic means control signals for receiving signals from the address bus lines and register bus lines, said incrementing means coupled to the temporary program counter register means for incrementing the temporary program counter register means signals in response to predetermined ones of the programmable logic means control signals and applying the incremented temporary program counter register means signals to the program counter register means and the duplicate program counter register means, said incremented temporary program counter register means signals further being switchably connected to the register bus lines in response to predetermined ones of the programmable logic means control signals;

a plurality of general purpose register means each having a plurality of signals and duplicate general purpose register means coupled in parallel therewith and having a plurality of signals, each general purpose register means switchably connected to the register bus lines in response to predetermined ones of the programmable logic means control signals for applying signals to the register bus lines and directly connected to the register bus lines for receiving signals from the register bus lines in response to predetermined ones of the programmable logic means control signals, and each duplicate general purpose register means switchably connected to the register bus lines in place of its corresponding general purpose register means in response to the interrupt signal; and first and second flip-flop means each storing corresponding condition signals and having duplicate flip-flop means coupled in parallel therewith, the condition signals being coupled to arithmetic logic means, and said duplicate flip-flop means being switchably coupled in place of the corresponding first and second flip-flop means in response to the interrupt signal;

arithmetic logic means having first and second register means each having a plurality of signals, the first register means being directly connected to the data bus lines for receiving signals therefrom and the second register means being directly connected to the register bus lines for receiving signals therefrom, said arithmetic logic means combining the first and second register means signals according to predetermined combinatorial functions selected by corresponding predetermined ones of the programmable logic means control signals and storing predetermined binary states of the condition signals in the first and second flip-flop means depending on the condition of said combined first and second register means signals, and said combined first and second register means signals further being switchably applied to the register bus lines in response to a predetermined one of the programmable logic means control signals.

2. The improved microcomputer according to claim 1, further including stack pointer counting means that is responsive to predetermined ones of the programmable logic means control signals for incrementing its contents, decrementing its contents, and applying its contents to the address bus lines.

3. The improved microcomputer according to claim 1 further including:

a plurality of interface signal lines;

data direction register means having a plurality of signals and being coupled to the register bus lines for receiving signals therefrom in response to a predetermined one of the programmable logic means control signals;

data register means having a plurality of signals and being coupled to the register bus lines for receiving signals therefrom in response to a predetermined one of the programmable logic means control signals; and means for applying the data register means signals to the interface signal lines in response to a predetermined binary state of corresponding data direction register signals.

4. The improved microcomputer according to claim 1, further including:

serial data bus means including two forward data signal lines and a return data signal line;

transmitting register means having a plurality of signals for receiving signals from, and applying signals to, the register bus lines in response to a predetermined one of the programmable logic means control signals, said transmitting register means responsive to said last predetermined one of the programmable logic means control signals for serially shifting its contents, and said transmitting register means coupled to the return data signal line of the serial data bus means for serially receiving signals therefrom in response to said last predetermined one of the programmable logic means control signals; and format generating means responsive to said last predetermined one of the programmable logic means control signals for applying signals serially shifted from the transmitting register means to the forward data signal lines of the serial data bus means in accordance with a predetermined format.

5. The improved microcomputer according to claim 1, wherein said first and second registers of the arithmetic logic means are latches.

6. The improved microcomputer according to claim 1, wherein the program counter register means, duplicate program counter register means, general purpose register means and duplicate general purpose register means are latches.

7. The improved microcomputer according to claim 1, further including page logic means for controlling the binary state of predetermined address signal lines of the address bus means in response to predetermined ones of the programmable logic means control signals.

8. The improved microcomputer according to claim 1, further including first and second memory means coupled to the data bus lines and address bus lines, said first memory means storing predetermined control program signals and being responsive to predetermined ones of the programmable logic means control signals for reading out control program signals from locations addressed by signals in the address bus lines and applying the read-out control program signals to the data bus lines, and said second memory means storing data signals and being responsive to predetermined ones of the programmable logic means control signals for storing signals from the data bus lines in locations addressed by signals on the address bus lines and reading out signals from locations addressed by signals on the address bus lines and applying the read-out signals to the data bus lines.

9. The improved microcomputer according to claim 1, further including substrate means, said microcomputer being formed of electrical circuit components integrated into the substrate means.

* * * * *